United States Patent
Louis et al.

(10) Patent No.: US 9,611,361 B2
(45) Date of Patent: Apr. 4, 2017

(54) POLYARYLENE ETHER SULFONE (PAES) COMPOSITIONS

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US); David B. Thomas, Atlanta, GA (US); Hemantkumar Patel, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 14/889,648

(22) PCT Filed: Apr. 30, 2014

(86) PCT No.: PCT/EP2014/058805
§ 371 (c)(1),
(2) Date: Nov. 6, 2015

(87) PCT Pub. No.: WO2014/180726
PCT Pub. Date: Nov. 13, 2014

(65) Prior Publication Data
US 2016/0083523 A1 Mar. 24, 2016

Related U.S. Application Data

(60) Provisional application No. 61/820,861, filed on May 8, 2013.

(30) Foreign Application Priority Data

Jul. 26, 2013 (EP) ..................... 13178121

(51) Int. Cl.
*C08G 14/00* (2006.01)
*C08G 75/23* (2006.01)
(52) U.S. Cl.
CPC ................... *C08G 75/23* (2013.01)
(58) Field of Classification Search
CPC ............ C08G 75/23; C08G 2261/3444; C08G 65/4093
See application file for complete search history.

(56) References Cited

U.S. PATENT DOCUMENTS

| | | |
|---|---|---|
| 5,204,442 A | 4/1993 | Nye |
| 2006/0030683 A1 | 2/2006 | Moore et al. |
| 2009/0124767 A1 | 5/2009 | El-Hibri |

FOREIGN PATENT DOCUMENTS

| | | |
|---|---|---|
| EP | 383600 A2 | 8/1990 |
| EP | 401603 A1 | 12/1990 |
| JP | 07072301 A | 3/1995 |
| WO | 9531502 A1 | 11/1995 |

OTHER PUBLICATIONS

Mao M. et al., "Synthesis and characterization of poly(aryl ether sulfone) copolymers containing terphenyl groups in the backbone", Polymer, 2007, vol. 48(21), p. 6241-6245—Elsevier Ltd., XP022278391, ISSN: 0032-3861, DOI: 10.1016/J.POLYMER.2007.08.036.
Robeson L.M. et al., "Synthesis and Dynamic Mechanical Characteristics of Poly(Ary Ethers)", Applied Polymer Symposium, 1975, N° 26, p. 373-385—John Wiley & Sons, Inc.
Staniland, P. A., "Synthesis and properties of novel polyether ketones and polyether sulfones", Bulletin des Societes Chimiques Beiges, 1989, vol. 98(9-10), p. 667-76.
Salunke A.K., "Synthesis and characterization of poly(arylene ether)s derived from 4,4'-bishydroxybiphenyl and 4,4'-bishydroxyterphenyl", Journal of Polymer Science, Part A: Polymer Chemistry, 2001, vol. Date 2002, vol. 40(1), p. 55-69—John Wiley & Sons, Inc.
Zhang B. et al., "Synthesis of cyclohexylene ring containing semi-crystalline poly(arylene ether sulfones)(PAES)", Polymer Preprints (American Chemical Society, Division of Polymer Chemistry), 2010, vol. 51(2), p. 217-218.

(Continued)

*Primary Examiner* — Shane Fang
(74) *Attorney, Agent, or Firm* — Jarrod N. Raphael

(57) ABSTRACT

A poly(arylether sulfone) polymeric material comprising polymer molecules wherein more than 50% moles of the recurring units of said polymer molecules are recurring units (Rt), equal to or different from each other, complying with formula $(S_t)$: $-E-Ar^1-SO_2-[Ar^2-(T-Ar^3)_n-SO_2]_m-Ar^4-$ (formula $S_t$) wherein: n and m, equal to or different from each other, are independently zero or an integer of 1 to 5, each of $Ar^1$, $Ar^2$, $Ar^3$ and $Ar^4$ equal to or different from each other and at each occurrence, is an aromatic moiety, T is a bond or a divalent group optionally comprising one or more than one heteroatom—E is of formula $(E_t)$: wherein each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; j' is zero or is an integer from 1 to 4; and wherein the fraction of polymer molecules having a molecular weight of below 5 000 [% fraction $M^{<5000}$, hereinafter] with respect to all the polymer molecules in said polymeric material is of at most 10% weight, and wherein said % fraction $M^{<5000}$ is of at least [3.02-PDI] % when the polymeric material possesses a polydispersity index (PDI) of below 3.02.

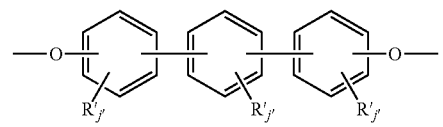

19 Claims, No Drawings

(56) References Cited

OTHER PUBLICATIONS

Cureton L.T. et al., "Synthesis and properties of bisphenol A-terphenol poly(arylene ether sulfone)-polydimethylsiloxane segmented block copolymers", European Polymer Journal, 2011, vol. 47(12), p. 2303-2310—Elsevier Ltd.

Kwiatkowski, G. T. et al., "Aromatic biphenylene polymers: synthesis via nickel coupling of aryl dichlorides", Makromolekulare Chemie, Macromolecular Symposia, 1992, 54/55(Int. Symp. New Polym. React. React. Mech., 1991), p. 199-224—Hüthig & Wepf Verlag, Basel.

Staniland, P. A., "Synthesis and environmental resistance of thermoplastic matrix and adhesive resins for composites", Polymer Preprints (American Chemical Society, Division of Polymer Chemistry), 1992, vol. 33(1), p. 404-5.

POLYARYLENE ETHER SULFONE (PAES) COMPOSITIONS

This application claims priority to U.S. provisional application No. 61/820,861 filed on 8 May 2014 and to European application No. 13178121.3 filed on 26 Jul. 2013, the whole content of each of these applications being incorporated herein by reference for all purposes.

FIELD OF INVENTION

The present invention relates to polyarylene ether sulfone (PAES) polymeric materials comprising moieties derived from incorporation of 4,4"-terphenyl-p-diol and to a process for the manufacture of said polyarylene ether sulfone (PAES) polymeric materials.

BACKGROUND OF THE INVENTION

The selection of polymeric material in more demanding, corrosive, harsh chemical, high-pressure and high-temperature (HP/HT) environments, such as notably in oil and gas downhole applications, in particular in deep see oil wells, is of ultimate importance as it implies that said polymeric materials need to possess some critical properties in order to resist the extreme conditions associated with said environments.

It should be mentioned that in these extreme conditions the polymeric materials are exposed in a prolonged fashion to high pressure, e.g. pressures higher than 30,000 psi, high temperatures, e.g. temperatures up to 260° C., and to harsh chemicals including acids, bases, superheated water/steam, and of course a wide variety of aliphatic and aromatic organics. For example, enhanced oil recovery techniques involve injecting of fluids such as notably water, steam, hydrogen sulfide ($H_2S$) or supercritical carbon dioxide ($sCO_2$) into the well. In particular, $sCO_2$ having a solvating effect similar to n-heptane, can cause swelling of materials in for instance seals, which affect consequently their performance. Polymeric materials having too low glass transition temperatures (Tg) relative to the high temperature in HP/HT applications will suffer from being weak and susceptible to high creep in these HP/HT applications. This creep can cause the seal material made of said polymeric material to no longer effectively seal after prolonged exposure at temperature which are 20 or more ° C. above their Tg.

Thus, properties such as maintaining mechanical rigidity and integrity (e.g. yield/tensile strength, hardness and impact toughness) at high pressure and temperatures of at least 250° C., good chemical resistance, in particular when exposed to $CO_2$, $H_2S$, amines and other chemicals at said high pressure and temperature, swelling and shrinking by gas and by liquid absorption, decompression resistance in high pressure oil/gas systems, gas and liquid diffusion and long term thermal stability need to be considered in the selection of appropriate polymeric materials for HP/HT applications.

Thus said polymeric materials need at least to possess a high glass transition temperature.

The utility of aromatic sulfone ether polymers in applications combining high thermal and chemical exposure has been limited due to the fact that said aromatic sulfone ether polymers are large amorphous materials and are therefore very limited in their chemical resistance. Semi-crystalline aromatic sulfone ether polymers are extremely rare.

Staniland reports notably in Table 1 of Polymer Preprints, American Chemical Society, Division of Polymer Chemistry, 1992, 33(1), pages 404-405, some crystalline polyethersulphone polymers having high transition glass temperatures (Tg) of above 200° C. and having melting temperatures of below 400° C. (e.g. Structures 1-4 and 7). The author is in particular referring to the polyethersulphone polymer of structure 4 described therein (i.e. —OØØØOØSO$_2$Ø—, being understood that Ø is Ph or a phenyl group) derived from 4,4' dichlorodiphenyl sulfone (DCDPS) and dihydroxyterphenylene, which has a Tg of 251° C. and a Tm of 359° C. Said polyethersulphone polymer of structure 4 was already earlier disclosed by the same author in Bulletin des Societes Chimiques Belges, 1989, 98 (9-10), pages 667-676. FIG. 6 of this paper shows notably a DSC (differential scanning calorimetry) scan of the polyethersulphone polymer of structure 4.

Said polyethersulphone polymer of structure 4 also disclosed in EP 0 383 600 A2, in particular, examples 1 and 2 describe the reaction of dichlorodiphenylsulfone (DCDPS, e.g. example 1) or difluorodiphenylsulfone (DFDPS, e.g. example 2) with 4,4"-terphenyl-p-diol (i.e. HO-Ph-Ph-Ph-OH, also called 4,4"-dihydroxyterphenylene). Said aromatic polymers described in example 1, respectively example 2 have a high transition glass temperature (Tg) of 241° C., respectively 251° C., a Tm melting point of 385° C., respectively 389° C., and a reduced viscosity (RV) measured at 25° C. on a solution of 1.0 g of polymer in 100 $cm^3$ $H_2SO_4$ of 0.27 (dL/g), respectively 1.40 (dL/g). As will be mentioned more in detail below, this example yielded a polymer with a $M_n$ of about 13,000-14,000 for polyethersulphone polymer of structure 4 when measured by a GPC method as described below. It is known that thermosets due to their three dimensional network of bonds (i.e. cross-linking) are suitable to be used in high temperature applications up to the decomposition temperature. However, one of the drawbacks is that they are more brittle.

Semi-crystalline polymers when crystallizing from the melt can crystallize in crystals of different structure. Mostly they can form lamellae of different thicknesses, which exhibit different melting temperatures. The fraction of crystals with thinner lamellae (i.e. imperfect crystals) melts at a lower temperature than the thicker lamellae. The presence of these two populations of crystals in general leads to the observation of a double melting endotherm (i.e. two peak melting temperatures) in the DSC. The lower melting temperature of these crystals in general limits the retention of mechanical properties above the Tg. Therefore, the difference between the first melting endotherm and the Tg advantageously should be as high as possible.

In view of all the above, there is still a current shortfall in the art for polyarylene ether sulfone (PAES) polymeric materials having good stiffness and ductility, good chemical resistance, high thermal resistance (e.g. Tg>230° C.), long term thermal stability, useful highest Tm between 360° C. and 420° C., and in particular very useful gap between the first melting endotherm and the Tg and thus said compositions can be particularly useful HP/HT applications requiring a very good chemical resistance.

DETAILED DESCRIPTION OF THE PRESENT INVENTION

The Applicant has now found that it is possible to advantageously manufacture polymeric materials comprising polyarylene ether sulfone (PAES) polymer molecules wherein said (PAES) polymer molecules comprise moieties derived from incorporation of 4,4"-terphenyl-p-diol and wherein said polymeric materials have controlled molecular weights distributions and are advantageously fulfilling all the above mentioned needs, including maintaining mechanical rigidity and integrity, improving the gap between the first melting temperature and the Tg and having in particular good chemical resistance at high pressure and temperature.

It is thus an object of the present invention a poly (arylether sulfone) polymeric material [(t-PAES) polymeric material, herein after] comprising polymer molecules, wherein more than 50% moles of the recurring units of said polymer molecules are recurring units ($R_t$), equal to or different from each other, complying with formula ($S_t$):

-E-Ar$^1$—SO$_2$—[Ar$^2$-(T-Ar$^3$)$_n$—SO$_2$]$_m$—Ar$^4$—   (formula $S_t$)

wherein:
n and m, equal to or different from each other, are independently zero or an integer of 1 to 5,
each of Ar$^1$, Ar$^2$, Ar$^3$ and Ar$^4$ equal to or different from each other and at each occurrence, is an aromatic moiety,
T is a bond or a divalent group optionally comprising one or more than one heteroatom; preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

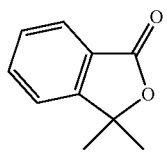

E is of formula (E$_t$):

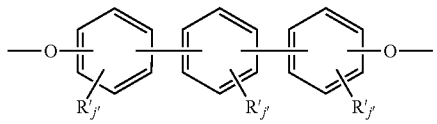

wherein
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 1 to 4; and
and wherein the fraction of polymer molecules having a molecular weight of below 5 000 [% fraction M$^{<5000}$, hereinafter] with respect to all the polymer molecules in said polymeric material is of at most 10%, and wherein said % fraction M$^{<5000}$ is of at least [3.02-PDI] % when the polymeric material possesses a polydispersity index (PDI) of below 3.02.

The Applicant has surprisingly found that the (t-PAES) polymeric materials having well defined amounts of % fraction M$^{<5000}$ with a required minimum amount of said % fraction M$^{<5000}$ being a function of their PDI when the latter is lower than 3.02, as detailed above, possess enhanced processability, higher chemical resistance, higher stiffness, larger gap between the first melting endotherm and the Tg leading to a higher retention of mechanical properties at high temperature, such as high stiffness and strength.

In one specific embodiment of the present invention, the fraction of polymer molecules of the (t-PAES) polymeric materials, as detailed above, having a molecular weight of below 5 000 [% fraction M$^{<5000}$, hereinafter] with respect to all the polymer molecules in said polymeric material is of at most 10%, and wherein said % fraction M$^{<5000}$ is of at least [3.07-PDI] % when the polymeric material possesses a polydispersity index (PDI) of below 3.07.

In another specific embodiment of the present invention, the fraction of polymer molecules of the (t-PAES) polymeric materials, as detailed above, having a molecular weight of below 5 000 [% fraction M$^{<5000}$, hereinafter] with respect to all the polymer molecules in said polymeric material is of at most 10%, and wherein said % fraction M$^{<5000}$ is of at least [3.12-PDI] % when the polymeric material possesses a polydispersity index (PDI) of below 3.12.

The Polymer Molecules of the (t-PAES) Polymeric Material

The aromatic moiety in each of Ar$^1$, Ar$^2$, Ar$^3$ and Ar$^4$ equal to or different from each other and at each occurrence is preferably complying with following formulae:

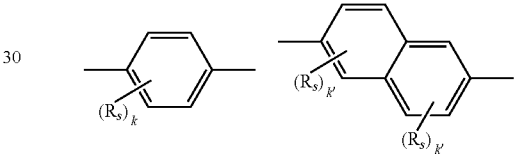

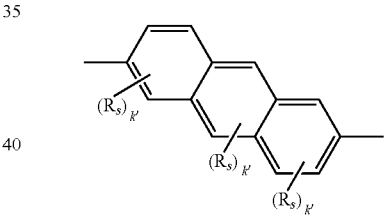

wherein:
each R$_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and k is zero or an integer of 1 to 4; k' is zero or an integer of 1 to 3.

In recurring unit (R$_t$), the respective phenylene moieties may independently have 1,2-, 1,4- or 1,3-linkages to the other moieties different from R or R' in the recurring unit. Preferably, said phenylene moieties have 1,3- or 1,4-linkages, more preferably they have 1,4-linkage.

Still, in recurring units (R$_t$), j', k' and k are at each occurrence zero, that is to say that the phenylene moieties have no other substituents than those enabling linkage in the main chain of the polymer.

Preferred recurring units (R$_t$) are selected from the group consisting of those of formula (S$_t$-1) to (S$_t$-4) herein below:

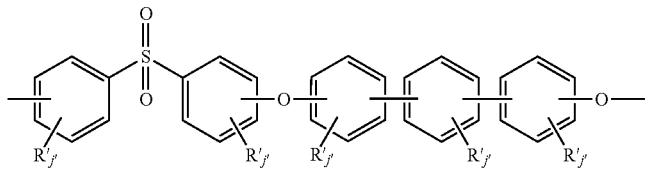
(S<sub>r</sub>-1)

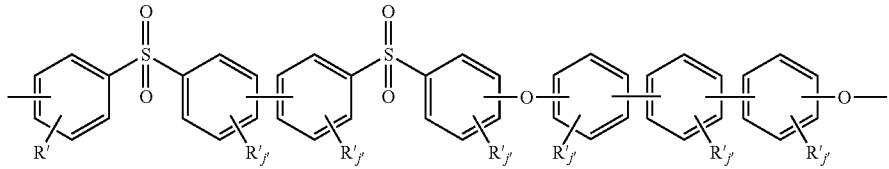
(S<sub>r</sub>-2)

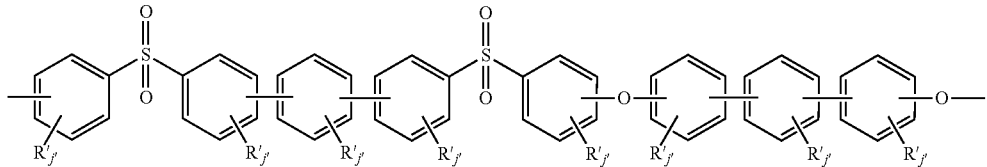
(S<sub>r</sub>-3)

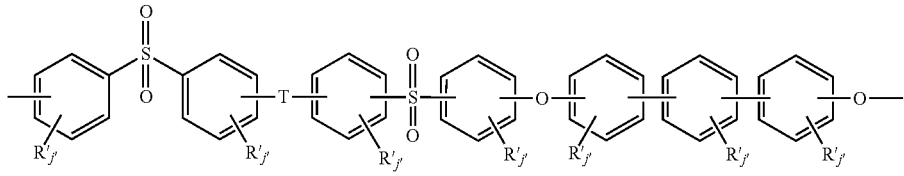
(S<sub>r</sub>-4)

wherein
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- j' is zero or is an integer from 1 to 4,
- T is a bond or a divalent group optionally comprising one or more than one heteroatom; preferably T is selected from the group consisting of a bond, $-CH_2-$, $-C(O)-$, $-C(CH_3)_2-$, $-C(CF_3)_2-$, $-C(=CCl_2)-$, $-C(CH_3)(CH_2CH_2COOH)-$, and a group of formula:

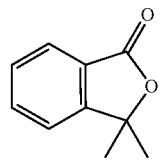

The above recurring units of preferred embodiments ($R_t$-1) to ($R_t$-4) can be each present alone or in admixture.

More preferred recurring units ($R_t$) are selected from the group consisting of those of formula ($S'_t$-1) to ($S'_t$-3) herein below:

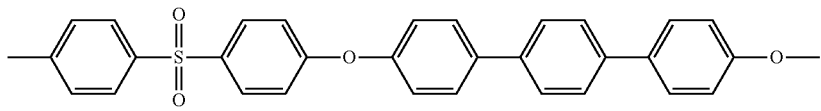
($S'_t$-1)

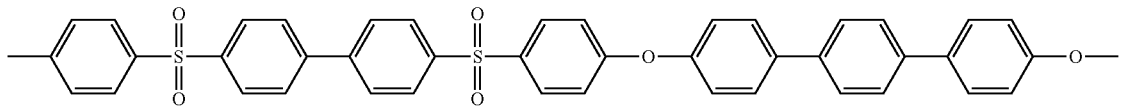
($S'_t$-2)

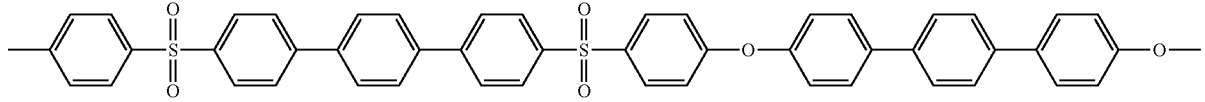
(S'<sub>t</sub>-3)

Most preferred recurring unit ($R_t$) is of formula (S'$_t$-1), as shown above. According to certain embodiments, the polymer molecules of the (t-PAES) polymeric material comprise in addition to recurring units ($R_t$), as detailed above, recurring units ($R_a$) of formula ($K_a$):

-E-Ar$^5$—CO—[Ar$^6$-(T-Ar$^7$)$_n$—CO]$_m$—Ar$^8$—  (formula $K_a$)

wherein:
- n and m, equal to or different from each other, are independently zero or an integer of 1 to 5,
- each of Ar$^5$, Ar$^6$, Ar$^7$ and Ar$^8$ equal to or different from each other and at each occurrence, is an aromatic moiety,
- T is a bond or a divalent group optionally comprising one or more than one heteroatom; preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

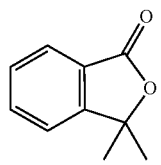

E is of formula (E$_t$), as detailed above.

Recurring units ($R_a$) can notably be selected from the group consisting of those of formulae ($K_a$-1) or ($K_a$-2) herein below:

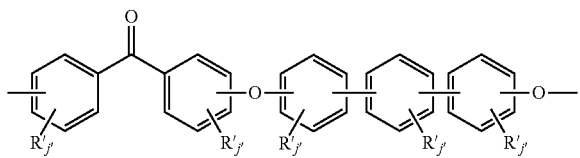
($K_a$-1)

-continued
($K_a$-2)

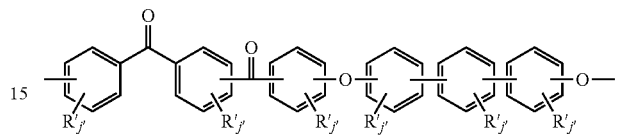

wherein
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- j' is zero or is an integer from 1 to 4.

More preferred recurring units ($R_a$) are selected from the group consisting of those of formula (K'$_a$-1) or (K'$_a$-2) herein below:

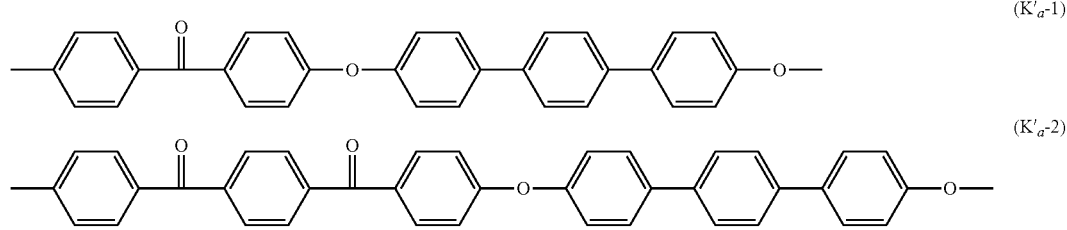
(K'$_a$-1)

(K'$_a$-2)

According to certain embodiments, the polymer molecules of the (t-PAES) polymeric material comprise in addition to recurring units ($R_t$), as detailed above recurring units ($R_b$) comprising a Ar—SO$_2$—Ar' group, with Ar and Ar', equal to or different from each other, being aromatic groups, said recurring units ($R_b$) generally complying with formulae (S1):

—Ar$^9$-(T'-Ar$^{10}$)$_n$—O—Ar$^{11}$—SO$_2$—[Ar$^{12}$-(T-Ar$^{13}$)$_n$—SO$_2$]$_m$—Ar$^{14}$—O—  (S1):

wherein:

Ar$^9$, Ar$^{10}$, Ar$^{11}$, Ar$^{12}$, Ar$^{13}$ and Ar$^{14}$, equal to or different from each other and at each occurrence, are independently a aromatic mono- or polynuclear group;

T and T', equal to or different from each other and at each occurrence, is independently a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

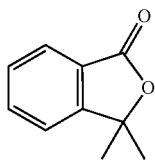

preferably T is selected from the group consisting of a bond, —CH₂—, —C(O)—, —C(CH₃)₂—, —C(CF₃)₂—, —C(=CCl₂)—, —C(CH₃)(CH₂CH₂COOH)—, and a group of formula:

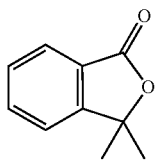

n and m, equal to or different from each other, are independently zero or an integer of 1 to 5;

Recurring units (R$_b$) can be notably selected from the group consisting of those of formulae (S1-A) to (S1-D) herein below:

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other are a bond or a divalent group optionally comprising one or more than one heteroatom; preferably T' is selected from the group consisting of a bond, —CH₂—, —C(CH₃)₂—, —C(CF₃)₂—, —C(=CCl₂)—, —C(CH₃)(CH₂CH₂COOH)—, —SO₂—, and a group of formula:

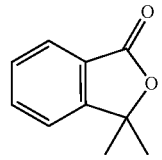

preferably T is selected from the group consisting of a bond, —CH₂—, —C(O)—, —C(CH₃)₂—, —C(CF₃)₂—, —C(=CCl₂)—, —C(CH₃)(CH₂CH₂COOH)—, and a group of formula:

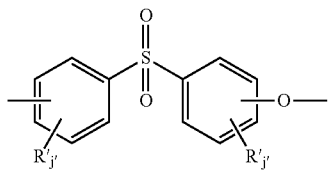
(S1-A)

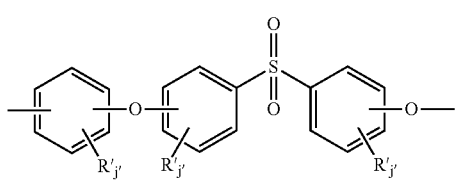
(S1-B)

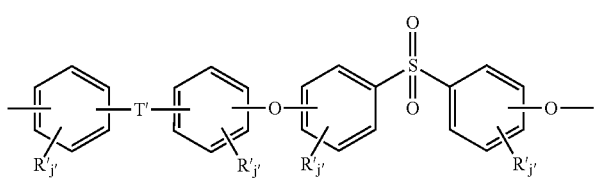
(S1-C)

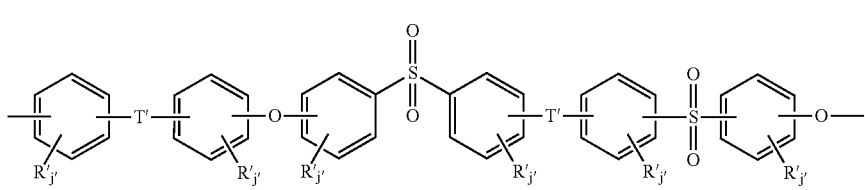
(S1-D)

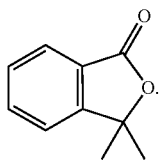

In recurring unit ($R_b$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage. Still, in recurring units ($R_b$), j' is at each occurrence zero, that is to say that the phenylene moieties have no other substituents than those enabling linkage in the main chain of the polymer.

According to certain embodiments, the polymer molecules of the (t-PAES) polymeric material comprise in addition to recurring units ($R_t$), as detailed above, recurring units ($R_c$) comprising a Ar—C(O)—Ar' group, with Ar and Ar', equal to or different from each other, being aromatic groups, said recurring units ($R_c$) being generally selected from the group consisting of formulae (J-A) to (J-L), herein below:

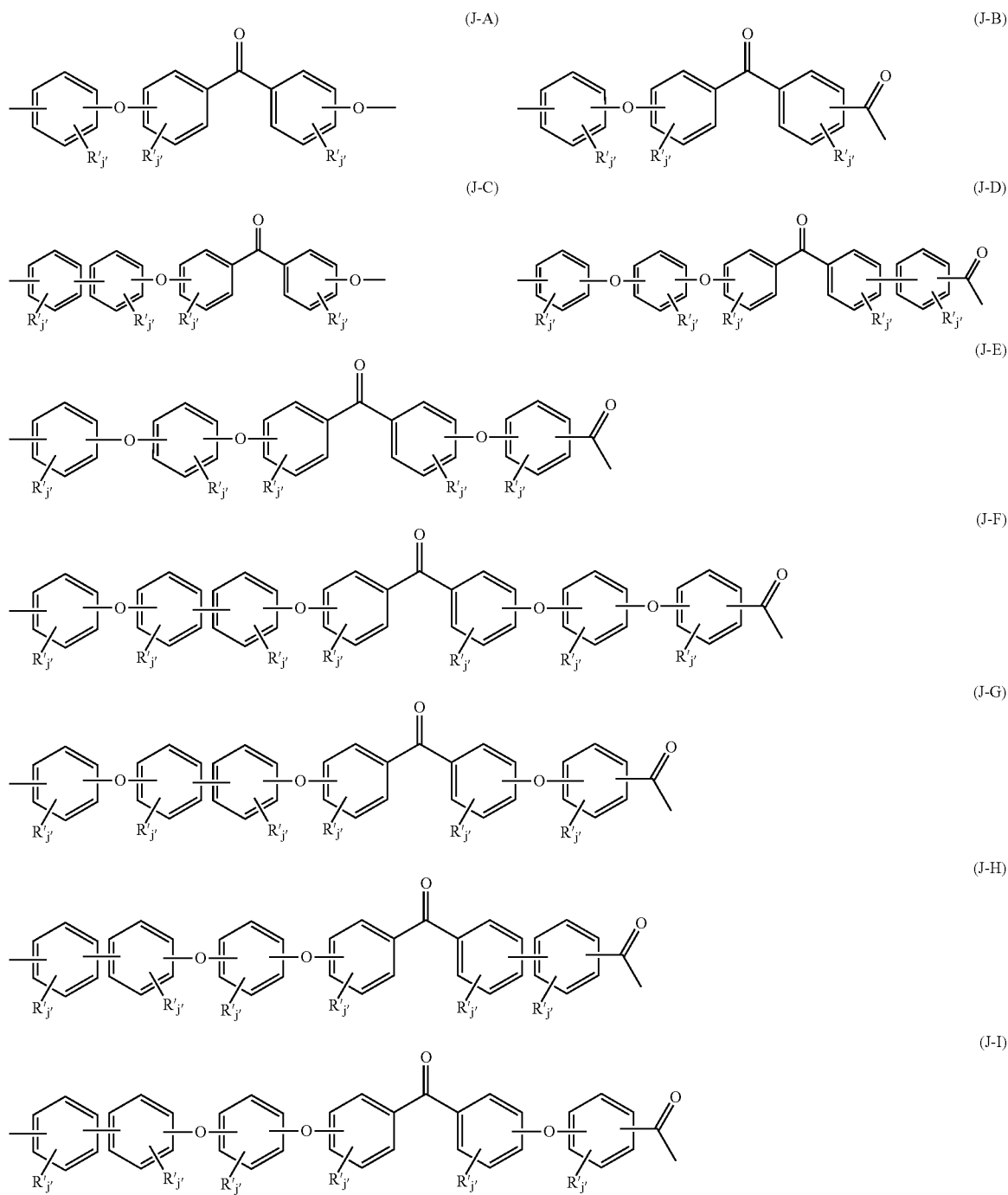

-continued

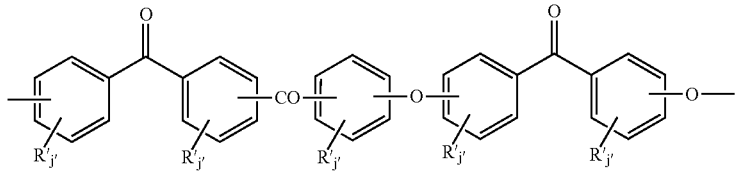
(J-J)

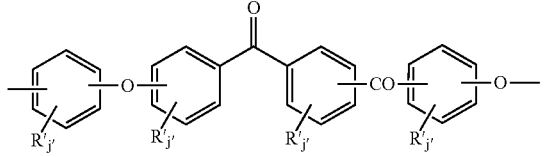
(J-K)

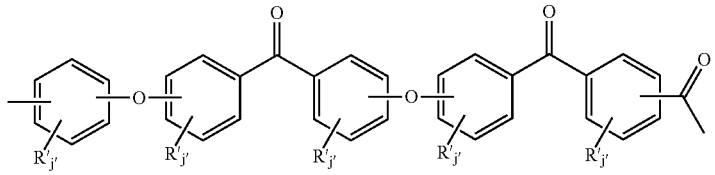
(J-L)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

In recurring unit ($R_c$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_c$), j' is at each occurrence zero, that is to say that the phenylene moieties have no other substituents than those enabling linkage in the main chain of the polymer.

As said, the polymer molecules of the (t-PAES) polymeric material comprises recurring units ($R_t$) of formula ($S_t$), as above detailed, in an amount of more than 50% moles, preferably more than 60% moles, more preferably more than 70% moles, even more preferably more than 80% moles, most preferably more than 90% moles, the complement to 100% moles being generally recurring units selected from the group consisting of recurring units ($R_a$), recurring units ($R_b$), recurring units ($R_t$), and mixtures thereof.

Still more preferably, essentially all the recurring units of the polymer molecules of the (t-PAES) polymeric material are recurring units ($R_t$). Chain defects, or very minor amounts of other units might be present, being understood that these latter do not substantially modify the properties of the polymer molecules of the (t-PAES) polymerization material. Most preferably, all the recurring units of the polymer molecules of the (t-PAES) polymeric material are recurring units ($R_t$).

The (t-PAES) Polymeric Material

The (t-PAES) polymeric material of the present invention has advantageously a polydispersity index (PDI) of more than 2.02, preferably more than 2.10, more preferably more than 2.20.

The (t-PAES) polymeric material of the present invention has advantageously a polydispersity index (PDI) of less than 4.0, preferably of less than 3.8, preferably of less than 3.5.

According to the present invention, the (t-PAES) polymeric material has advantageously a number average molecular weight ($M_a$) above 20 000, more preferably above 25 000, more preferably above 28 000 and most preferably above 30 000.

Upper limit for the number average molecular weight ($M_a$) of the (t-PAES) polymeric material is not particularly critical and will be selected by the skilled in the art in view of final field of use.

In one embodiment of the present invention, the (t-PAES) polymeric material has advantageously a number average molecular weight ($M_a$) equal to or below 100 000, preferably equal to or below 75 000, preferably equal to or below 70 000, preferably equal to or below 65 000, preferably equal to or below 60 000, preferably equal to or below 55 000, preferably equal to or below 50000.

In one embodiment of the present invention, the (t-PAES) polymeric material has advantageously a number average molecular weight ($M_a$) in the range from 25 000 to 100 000, preferably ranging from 28 000 to 75 000, preferably ranging from 30 000 to 70 000.

The expression "number average molecular weight ($M_n$)" is hereby used according to it usual meaning and mathematically expressed as:

$$M_n = \frac{\sum M_i \cdot N_i}{\sum N_i}$$

wherein $M_i$ is the discrete value for the molecular weight of polymer molecule, $N_i$ is the number of polymer molecules with molecular weight then the weight of all polymer molecules is $\Sigma M_i N_i$ and the total number of polymer molecules is $\Sigma N_i$.

$M_n$ can be suitably determined by gel-permeation chromatography (GPC), calibrated with polystyrene standards.

The expression "the fraction of polymer molecules having a molecular weight of below 5 000 [% fraction $M^{<5000}$]" is hereby used according to it usual meaning and mathematically expressed as:

$$\% \text{ fraction } M^{<5000} = \frac{\sum_{M_i=0}^{5000} M_i N_i}{\sum_{M_i=0}^{\infty} M_i N_i} * 100\%$$

wherein $M_i$ is the discrete value for the molecular weight of a polymer molecule, $N_i$ is the number of polymer molecules with molecular weight then the weight of all polymer molecules is $\Sigma M_i N_i$.

% fraction $M^{<5000}$ can be suitably determined from slice data of GPC chromatogram by help of gel-permeation chromatography software which is calibrated with polystyrene standards, in which case it corresponds to:

$$\% \text{ fraction } M < 5000 = \frac{\int_{M=0}^{M=5000} AU \, dM}{\int_{M=0}^{M=\infty} AU \, dM} * 100\%$$

wherein AU (detector response in μV) is the y-axis unit and log M (logarithm of molecular weight) is the x-axis unit.

Other molecular parameters which can be notably determined by GPC are the weight average molecular weight ($M_w$):

$$M_w = \frac{\sum M_i^2 \cdot N_i}{\sum M_i \cdot N_i},$$

wherein $M_i$ is the discrete value for the molecular weight of a polymer molecule, $N_i$ is the number of polymer molecules with molecular weight then the weight of polymer molecules having a molecular weight $M_i$ is $M_i N_i$.

For the purpose of the present invention, the polydispersity index (PDI) is hereby expressed as the ratio of weight average molecular weight ($M_w$) to number average molecular weight ($M_n$).

The details of the GPC measurement are described in detail in the method description given in the experimental section.

For the determination of the number average molecular weight ($M_n$) by GPC, the (t-PAES) polymeric material is generally dissolved in a solvent suitable for GPC providing hereby a polymer solution which can be injected into conventional GPC equipment.

The concentration of the (t-PAES) polymeric material in the polymer solution for the GPC measurement [polymer concentration, herein after] is between 1.0 to 10.0 mg/ml, preferably between 1.5 to 5.0 mg/ml, more preferably between 2.0 to 3.0 mg/ml. Good results were obtained with a concentration of the (t-PAES) polymeric material in the polymer solution of about 2.5 mg/ml.

Preferred solvents and solvent blends suitable to dissolve the (t-PAES) polymeric material of the present invention for determination of the $M_n$ values are for example 4-chlorophenol, 2-chlorophenol, meta-cresol. 4-chlorophenol is most preferred.

The dissolving of the (t-PAES) polymeric material of the present invention is advantageously carried out at a temperature from 100 to 250° C., preferably from 120 to 220° C. and more preferably from 170 to 200° C.

For the determination of the $M_n$ values by GPC, N-methyl-2-pyrrolidone (NMP) containing at least one salt is suitably used as eluent.

Suitable salts for use in NMP include lithium bromide and lithium chloride. Lithium bromide is most preferred.

The molar concentration of said salt present in NMP can vary from 0.05 mole salt per liter NMP to 0.2 mole salt per liter NMP. Good results were obtained when the molar concentration of said salt present in NMP is about 0.1 mole salt per liter NMP.

In a preferred embodiment, said polymer solution, before injecting into the GPC equipment, is further diluted by the eluent thereby providing a diluted polymer solution [polymer solution (2), herein after].

In this preferred embodiment, the concentration of the (t-PAES) polymeric material in the polymer solution (2) [polymer concentration (2), herein after] is between 0.05 to 0.50 mg/ml, preferably between 0.10 to 0.25 mg/ml, more preferably between 0.20 to 0.25 mg/ml. Good results were obtained with a concentration of the (t-PAES) polymeric material in the polymer solution (2) of about 0.25 mg/ml.

The GPC measurements are in general carried out at a temperature from 20 to 50° C., preferably from 30 to 50° C., more preferably from 35 to 45° C. Good results were obtained when the temperature was about 40° C.

The GPC measurements are in general carried out at a pump flow rate from 0.3 to 0.9 ml/min, preferably from 0.5 to 0.7 ml/min. Good results were obtained when the flow rate was about 0.5 ml/min.

It is understood that the calibration with the polystyrene standards is carried out according to ordinary skills in the art. The details of said calibration with the polystyrene standards can be found in the experimental section below.

Another aspect of the present invention is related to the GPC measurement as described above.

The (t-PAES) polymeric material of the present invention advantageously possesses a glass transition temperature of at least 210° C., preferably 220° C., more preferably at least 230° C.

Glass transition temperature ($T_g$) is generally determined by DSC, according to ASTM D3418 on the polymer material powder.

For the purpose of the present invention, the second melting temperature ($T_{mII}$) of the (t-PAES) polymeric material of the present invention has been measured by DSC on compression molded samples of the (t-PAES) polymeric material of the present invention, according to a modified ASTM D3418 method as detailed in the experimental section and refers to the peak temperature at which the second melting endotherm is observed in the $1^{st}$ heat cycle (20° C./min).

The (t-PAES) polymeric material of the present invention advantageously possesses a second melting temperature ($T_{mII}$) of at least 330° C., preferably 340° C., more preferably at least 350° C. The (t-PAES) polymeric material of the present invention advantageously possesses second melting temperature ($T_{mII}$) below 430° C., preferably below 420° C. and more preferably below 410° C.

For the purpose of the present invention, the first melting temperature ($T_{mI}$) of the (t-PAES) polymeric material of the present invention has been measured by DSC on compression molded samples of the (t-PAES) polymeric material of the present invention, according to a modified ASTM D3418 method as detailed in the experimental section and refers to the peak temperature at which the first melting endotherm is observed in the $1^{st}$ heat cycle (20° C./min).

The Applicant has surprisingly found that the compression molded samples of the (t-PAES) polymeric material of the present invention possesses a very large difference between the first melting temperature ($T_{mI}$) and the glass transition temperature (Tg) thereby leading to a better retention of mechanical properties above the $T_g$.

According to the present invention, molded parts of the (t-PAES) polymeric material have advantageously a difference between the first melting temperature ($T_{mI}$) and the Tg of at least 78° C.

If desired, the molded parts of the (t-PAES) polymeric material have advantageously a difference between the first melting temperature ($T_{mI}$) and the Tg of above 78° C.

The weight of the polymer molecules, as detailed above, in the (t-PAES) polymeric material is advantageously above 50%, preferably above 75%, more preferably above 85% and even more preferably above 95%, over the entire weight of the (t-PAES) polymeric material.

In a preferred embodiment of the present invention, the (t-PAES) polymeric material consists of the (t-PAES) polymer molecules, as detailed above.

As will be detailed later on, the (t-PAES) polymeric material can be a (t-PAES) polymer selected from a group consisting of a (t-PAES) homopolymer and a (t-PAES) copolymer such as notably a random, a graft or a block (t-PAES) copolymer.

When the (t-PAES) polymeric material is a (t-PAES) homopolymer, it consist of (t-PAES) polymer molecules of which substantially all the recurring units are recurring units of formula ($S_t$), being nevertheless understood that chain defects, or very minor amounts of other units might be present, provided these latter do not substantially modify the properties of the (t-PAES) homopolymer.

When the (t-PAES) polymeric material is a (t-PAES) copolymer, the (t-PAES) polymer molecules may notably contain (i) at least two different recurring units ($R_t$) of formula ($S_t$), or (ii) recurring units ($R_t$) of formula ($S_t$) and recurring units ($R_a$), as above detailed, and/or recurring units ($R_b$), and/or recurring units ($R_c$), as above detailed.

Although, the method for manufacturing the (t-PAES) polymeric material of the present invention is not particularly limited, said (t-PAES) polymeric material can be advantageously prepared by polymerizing the appropriate monomers in conditions suitable for matching the requirements related to % fraction $M^{<5000}$, as above detailed, or can advantageously be manufactured by mixing different (t-PAES) polymers wherein said polymers are not complying necessarily with said % fraction $M^{<5000}$ requirements, when taken individually.

In a first embodiment, the (t-PAES) polymeric material of the present invention is a (t-PAES) polymer wherein said (t-PAES) polymer can be manufactured by a polymerization process which comprises reacting in a solvent mixture comprising a polar aprotic solvent and in the presence of an alkali metal carbonate, a monomer mixture which contains:

at least one dihydroxyaryl compound [diol (AA), herein after] of formula (T):

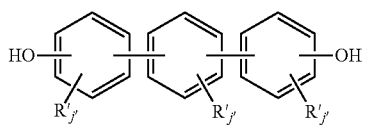

formula (T)

wherein
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 1 to 4 at least one dihaloaryl compound [dihalo(BB), herein after] of formula (S):

X—Ar$^1$—SO$_2$—[Ar$^2$-(T-Ar$^3$)$_n$—SO$_2$]$_m$—Ar$^4$—X'    formula (S)

wherein
n and m, equal to or different from each other, are independently zero or an integer of 1 to 5; X and X', equal to or different from each other, are halogens selected from F, Cl, Br, I; preferably Cl or F.

each of Ar$^1$, Ar$^2$, Ar$^3$ and Ar$^4$ equal to or different from each other and at each occurrence, is an aromatic moiety.

T is a bond or a divalent group optionally comprising one or more than one heteroatom; preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

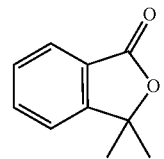

optionally, at least one dihydroxyaryl compound [diol (A'A')] different from diol (AA), as detailed above;
optionally, at least one dihaloaryl compound [dihalo (B'B')] different from dihalo (BB), as detailed above;
and at least 1% mole of at least one hydroxyl compound comprising only one reactive hydroxy group [agent (MOH), herein after], with respect to the total moles of diol (AA), and optionally of the diol (A'A').

The aromatic moiety in each of Ar$^1$, Ar$^2$, Ar$^3$ and Ar$^4$ equal to or different from each other and at each occurrence is preferably complying with following formulae:

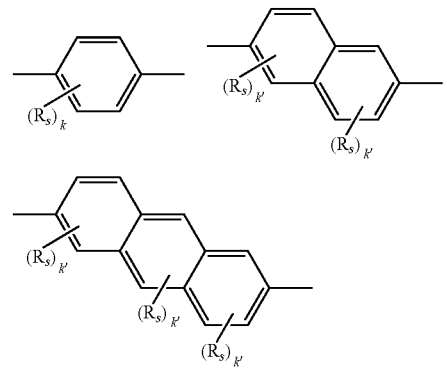

wherein:
each $R_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
k is zero or an integer of 1 to 4; k' is zero or an integer of 1 to 3.

Preferred dihalo (BB) are those complying with formulae (S'-1) to (S'-4), as shown below:

(S'-1)
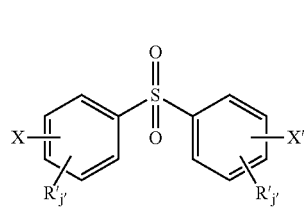

(S'-2)
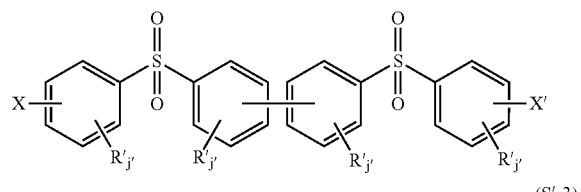

More preferred dihalo (BB) are those complying with following formulae shown below:

(S'-3)
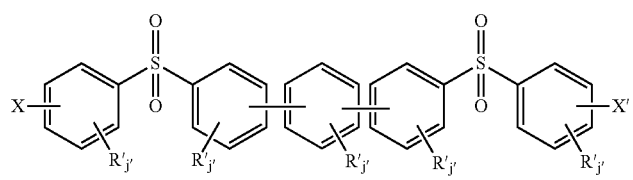

(S'-4)
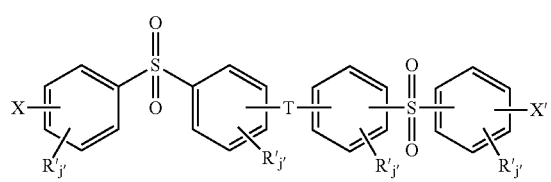

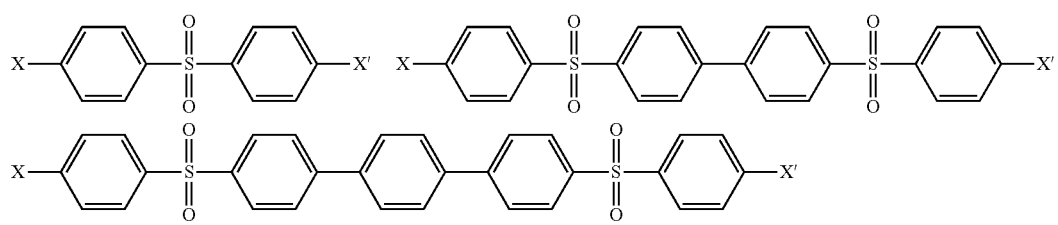

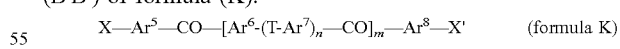

wherein
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- j' is zero or is an integer from 1 to 4,
- T is a bond or a divalent group optionally comprising one or more than one heteroatom; preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

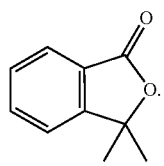

X and X', equal to or different from each other, are independently a halogen atom, preferably Cl or F.

wherein X and X' are as defined above, X and X', equal to or different from each other, are preferably Cl or F. More preferably X and X' are F.

Preferred dihaloaryl compounds [dihalo (BB)] are 4,4'-difluorodiphenyl sulfone (DFDPS), 4,4'-dichlorodiphenyl sulfone (DCDPS), 4,4'-chlorofluorodiphenyl sulfone or a mixture thereof. Most preferred dihalo (BB) is 4,4'-difluorodiphenyl sulfone (DFDPS) or a mixture of DFDPS and DCDPS.

Among dihaloaryl compound [dihalo (B'B')] different from dihalo (BB) mention can be notably made of dihalo (B'B') of formula (K):

$$X-Ar^5-CO-[Ar^6-(T-Ar^7)_n-CO]_m-Ar^8-X' \quad \text{(formula K)}$$

wherein:
- n and m, equal to or different from each other, are independently zero or an integer of 1 to 5,
- each of Ar$^5$, Ar$^6$, Ar$^7$ and Ar$^9$ equal to or different from each other and at each occurrence, is an aromatic moiety,
- T is a bond or a divalent group optionally comprising one or more than one heteroatom; preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

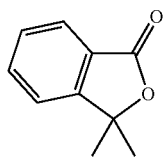

X and X', equal to or different from each other, are independently a halogen atom, preferably Cl or F.

More preferred dihalo (B'B') are those complying with following formulae shown below:

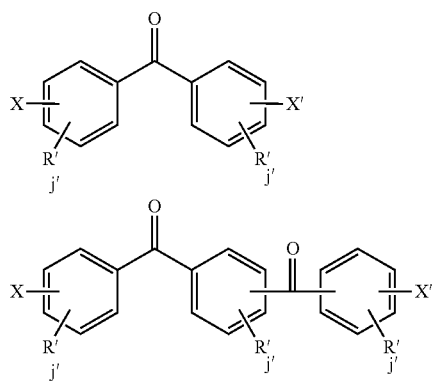

wherein
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 1 to 4;

wherein X and X' are as defined above, X and X', equal to or different from each other, are preferably Cl or F. More preferably X and X' are F.

Preferred dihalo (B'B') are 4,4'-difluorobenzophenone, 4,4'-dichlorobenzophenone and 4-chloro-4'-fluorobenzophenone, with 4,4'-difluorobenzophenone being particularly preferred.

Among dihydroxyl compounds [diols (A'A')] different from diol (AA), as above detailed, mention can be of compounds of formula (D):

$$HO-Ar^9-(T'-Ar^{10})_n-O-H \quad \text{formula (D)}$$

wherein:
n is zero or an integer of 1 to 5;
each of $Ar^9$ and $Ar^{10}$, equal to or different from each other and at each occurrence, is an aromatic moiety of the formula:

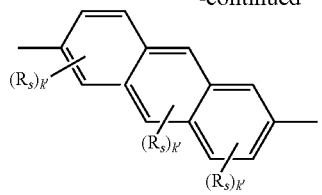

wherein:
each $R_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and k is zero or an integer of 1 to 4; k' is zero or an integer of 1 to 3;

T' is a bond or a divalent group optionally comprising one or more than one heteroatom; preferably T is selected from the group consisting of a bond, $-SO_2-$, $-CH_2-$, $-C(O)-$, $-C(CH_3)_2-$, $-C(CF_3)_2-$, $-C(=CCl_2)-$, $-C(CH_3)(CH_2CH_2COOH)-$, and a group of formula:

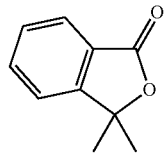

Among preferred dihydroxyl compounds [diols (A'A')] different from diol (AA), as above detailed, suitable for being used in the process of the present invention, mention may be notably made of the following molecules:

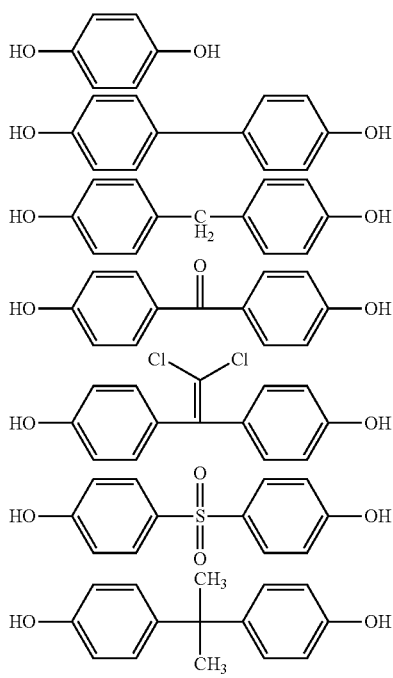

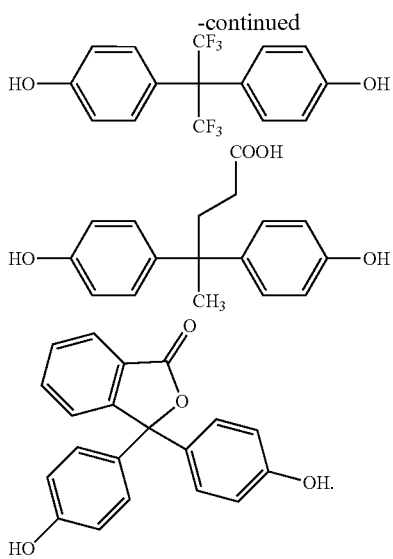

For the purpose of the present invention, the expression 'hydroxyl compound comprising only one reactive hydroxy group [agent (MOH)]' is intended to encompass not only monohydroxylated compounds but also hydroxylated compounds comprising more than one hydroxy group, but wherein only one of said hydroxy group is reactive.

It is nevertheless generally preferred that said agent (MOH) comprises only one hydroxy group.

The agent (MOH) can be added separately to the solvent mixture or can be comprised as an impurity in the diol (AA), as detailed above and optionally of the diol (A'A'), as detailed above.

Thus, agent (MOH) is preferably selected from the group consisting of terphenol, phenol, phenylphenol, biphenylphenol, phenoxyphenol, 4-monohydroxydiphenylsulfone, 4-monohydroxybenzophenone.

Good results were obtained when the agent (MOH) is a combination of phenylphenol and biphenylphenol.

If desired, the amount of the at least one hydroxyl compound comprising only one reactive hydroxy group [agent (MOH), herein after], as detailed above, with respect to the total moles of diol (AA), and optionally of the diol (A'A') is above 1.05% mole.

The overall amount of halo-groups and hydroxyl-groups of the monomers of the monomer mixture is preferably substantially equimolecular.

For the purpose of the present invention, the expression "substantially equimolecular" used with reference to the overall amount of halo-groups and hydroxyl-groups of the monomers initially present at the start of the reaction of the monomer mixture, as above detailed, is to be understood that the molar ratio of the overall amount of hydroxyl groups of the monomers of the monomer mixture to the overall amount of halo groups of the monomers of the monomer mixture is above 0.985, preferably above 0.990, more preferably above 0.995. It is further understood that the molar ratio of the overall amount of hydroxyl groups of the monomers of the monomer mixture to the overall amount of halo groups of the monomers of the monomer mixture is below 1.015, preferably below 1.010, more preferably below 1.005. Good results were obtained when the molar ratio of the overall amount of hydroxyl groups of the monomers of the monomer mixture to the overall amount of halo groups of the monomers of the monomer mixture is about 1.00.

The reaction is advantageously carried out at a total % monomer mixture concentration [total % monomers, herein after] equal to or more than 22% and less than 50% with respect to the combined weight of monomer mixture and solvent mixture.

For the purpose of the present invention, the term "total % monomers" is defined as the sum of the weight of all monomers initially present at the start of the reaction in the monomer mixture in grams, designated as $M_{wt}$, divided by the combined weight of all monomers initially present in the monomer mixture and of the solvent mixture, wherein the weight of the solvent mixture in grams is designated as $S_{wt}$.

The total % monomers is thus equal to the formula:

$$100 \times M_{wt}/(M_{wt}+S_{wt}).$$

The total % monomers is preferably equal to or more than 24%, more preferably equal to or more than 25%.

The total % monomers is in general less than 60%, preferably less than 50%, more preferably less than 45% and even more preferably less than 42%.

Very good results have been obtained at a total % monomers in a range from 25%-42%.

If desired, a small amount of the dihalo(BB), as described above, and/or dihalo (B'B'), as described above, can be added to the reaction mixture when the reaction is essentially complete.

For the purpose of the present invention, the expression "essentially complete" used with reference to the reaction is to be understood that the amount of all monomers which were initially present at the start of the reaction in the monomer mixture is below 1.5% mol, preferably below 1% mol, relative to the total amount of all monomers which were initially present at the start of the reaction.

Said small amount, expressed in a molar amount with respect to the total amount of moles of the diol (AA), as detailed above and optionally the diol (A'A'), as detailed above, is typically in the range from about 0.1 to 15% mol, with respect to the total amount of moles of the diol (AA), as detailed above, and optionally of the diol (A'A'), preferably from 0.2 to 10% mol, more preferably from 0.5 to 6% mol.

If desired, the solvent mixture can further comprise any end-capping agent [agent (E)]. Non limiting examples of an agent (E) includes notably a halo compound comprising only one reactive halo group [agent (MX)] and an agent (MOH), as defined above.

The expression 'halo compound comprising only one reactive halo group [agent (MX)]' is intended to encompass not only monohalogenated compounds but also halogenated compounds comprising more than one halo group, but wherein only one of said halo group is reactive.

It is nevertheless generally preferred that said agent (MX) comprises only one halo group.

Thus, agent (MX) is preferably selected from the group consisting of 4-monochlorodiphenylsulfone, 4-mono fluorodiphenylsulfone, 4-monofluorobenzophenone, 4-monochlorobenzophenone, alkylchlorides such as methylchloride and the like.

The total amount of agent (E), computed as $$\text{agent }(E)(\% \text{ moles}) = \left[\frac{\text{moles of agent }(MX)}{\text{total moles of }(dihalo(BB) + dihalo(B'B'))} + \frac{\text{moles of agent }(MOH)}{\text{total moles of }(diol\ (AA) + diol\ (A'A'))}\right] \cdot 100$$

is advantageously comprised between 0.05 and 20% moles, being understood that the agent (E) might advantageously be agent (MX) alone, agent (MOH) alone or a combination thereof. In other words, in above mentioned formula, the amount of agent (MX) with respect to the total moles of dihalo(BB), as detailed above, optionally of dihalo (B'B'), as detailed above, can be from 0.05 to 20% moles, the amount of agent (MOH) with respect to the total moles of diol (AA), as detailed above, and optionally of the diol (A'A'), can be from 0.05 to 20% moles, with the additional provisions that their sum is of 0.05 to 20% moles.

The amount of agent (E), as above described, is of at most 10% moles, preferably at most 8% moles, more preferably at most 6% moles.

The amount of agent (E), as above described, is of at least 1% moles, preferably at least 2% moles.

The agent (E) can be present at the start of the reaction in the monomer mixture or/and can be added to the reaction mixture when the reaction is essentially complete.

According to all embodiments of the present invention, the diol (AA) and dihalo (BB) and all other optional components (e.g. diol (A'A') and dihalo (B'B')) are dissolved or dispersed in a solvent mixture comprising a polar aprotic solvent.

As polar aprotic solvents, mention can be made of sulphur containing solvents such as notably aromatic sulfones and aromatic sulfoxides and more specifically diaromatic sulfones and diaromatic sulfoxides according to the general formulae below:

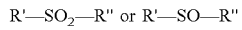

wherein R' and R", equal to or different from each other, are independently aryl, alkaryl and araryl groups.

More preferred polar aprotic solvents are those complying with following formulae shown below:

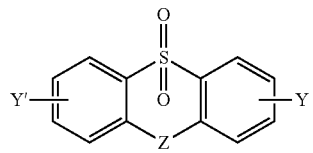

wherein Y and Y', equal to or different from each other, are independently selected from the group consisting of halogen, alkyl, alkenyl, alkynyl, aryl, alkaryl, aralkyl; Z is a bond, oxygen or two hydrogens (one attached to each benzene ring).

Specifically, among the sulphur-containing solvents that may be suitable for the purposes of this invention are diphenyl sulfone, phenyl tolyl sulfone, ditolyl sulfone, xylyl tolyl sulfone, dixylyl sulfone, tolyl paracymyl sulfone, phenyl biphenyl sulfone, tolyl biphenyl sulfone, xylyl biphenyl sulfone, phenyl naphthyl sulfone, tolyl naphthyl sulfone, xylyl naphthyl sulfone, diphenyl sulfoxide, phenyl tolyl sulfoxide, ditolyl sulfoxide, xylyl tolyl sulfoxide, dixylyl sulfoxide, dibenzothiophene dioxide, and mixtures thereof. Very good results have been obtained with diphenyl sulfone.

Other carbonyl containing polar aprotic solvents, including benzophenone and the like have been disclosed in the art for use in these type of processes, and may also be found useful in the practice of this invention.

If desired, an additional solvent can be used together with the polar aprotic solvent which forms an azeotrope with water, whereby water formed as a by-product during the polymerization may be removed by continuous azeotropic distillation throughout the polymerization.

The by-product water and carbon dioxide possibly formed during the polymerization can alternatively be removed using a controlled stream of an inter gas such as nitrogen or argon over and/or in to the reaction mixture in addition to or advantageously in the absence of an azeotrope-forming solvent as described above.

For the purpose of the present invention, the term "additional solvent" is understood to denote a solvent different from the polar aprotic solvent and the reactants and the products of said reaction.

The additional solvent that forms an azeotrope with water will generally be selected to be inert with respect to the monomer components and polar aprotic solvent. Suitable azeotrope-forming solvents for use in such polymerization processes include aromatic hydrocarbons such as benzene, toluene, xylene, ethylbenzene, chlorobenzene and the like.

The azeotrope-forming solvent and polar aprotic solvent are typically employed in a weight ratio of from about 1:10 to about 1:1, preferably from about 1:5 to about 1:3.

The alkali metal carbonate is preferably sodium carbonate, potassium carbonate, rubidium carbonate and cesium carbonate. Sodium carbonate and especially potassium carbonate are preferred. Mixtures of more than one carbonates can be used, for example, a mixture of sodium carbonate or bicarbonate and a second alkali metal carbonate or bicarbonate having a higher atomic number than that of sodium.

The amount of said alkali metal carbonate used, when expressed by the ratio of the equivalents of alkali metal (M) per equivalent of hydroxyl group (OH) [eq. (M)/eq. (OH)] ranges from 1.00 to 1.50, preferably from 1.00 to 1.30, more preferably from about 1.00 to 1.20, most preferably from about 1.00 to 1.10 being understood that above mentioned hydroxyl group equivalents are comprehensive of those of the diol (AA), and, if present, of diol (A'A'). Very good results have been obtained with a ratio of eq. (M)/eq. (OH) of 1.01-1.10.

The Applicant has surprisingly found that the use of an optimum amount of alkali metal carbonate allows reducing significantly the reaction times of the process of the present invention while avoiding using excessive amounts of alkali metal carbonate which leads to higher costs and more difficult polymer purifications.

The use of an alkali metal carbonate having an average particle size of less than about 200 μm, preferably of less than about 150 μm preferably of less than about 75 μm, more preferably <45 μm is especially advantageous. The use of an alkali metal carbonate having such a particle size permits the synthesis of the polymers meeting our molecular weight requirements.

If desired, at least one salt (S1) able to react with a fluoride salt (S2) can be added to the reaction mixture. Said fluoride salt (S2) can be formed as one of the by-products during the polymerization reaction when X or/and X' in dihalo (BB) and/or dihalo (B'B') is F. Examples of such fluoride salt (S2) are notably sodium fluoride and potassium fluoride. Suitable salts (S1) for use in such polymerization processes include lithium chloride, calcium chloride and magnesium chloride. It is preferably lithium chloride.

The polymerization process is advantageously pursued while taking care to avoid the presence of any reactive gases in the reactor. These reactive gases may be notably oxygen, water and carbon dioxide. $O_2$ is the most reactive and should therefore be avoided.

In a particular embodiment, the reactor should be evacuated under pressure or under vacuum and filled with an inert gas containing less than 20 ppm of reactive gases, and in particular less than 10 ppm of $O_2$ prior to adding the alkali metal carbonate to the reaction mixture. Then, the reactor should be put under a constant purge of said inert gas until the end of the reaction. The inert gas is any gas that is not reactive under normal circumstances. It may be chosen from nitrogen, argon or helium. The inert gas contains preferably less than 10 ppm oxygen, 20 ppm water and 20 ppm carbon dioxide.

Generally, after an initial heat up period, the temperature of the reaction mixture will be maintained in a range of advantageously from 250 to 350° C., preferably from 300 to 340° C. Good results were obtained at a temperature at about 320° C.

In the polymerization process, as detailed above, the alkali metal carbonate, in particular potassium carbonate is added to the monomer mixture at a temperature from 25 to 280° C., preferably from 120 to 270° C., more preferably from 180 to 250° C.

In a more preferred embodiment, the alkali metal carbonate, in particular potassium carbonate is first added to the diol (AA), as described above, and optionally the diol (A'A'), as described above, in the solvent mixture, as described above, and the dihalo (BB), as detailed above and optionally the dihalo (B'B'), as detailed above, is then added to said reaction mixture at a temperature from 25 to 280° C., preferably from 120 to 270° C., more preferably from 180 to 250° C.

In general, the end-capping agent, as described above, is added to the reaction mixture, as described above, at a temperature from 250 to 350° C., preferably from 300 to 340° C.

In an alternative embodiment to the first embodiment of the present invention, a trihydroxy compound comprising three reactive hydroxy groups [agent $(M(OH)_3)$, herein after] or a trihalo compound comprising three reactive halo groups [agent $(M(X)_3)$, herein after] can be used instead of the agent (MOH), as mentioned in the first embodiment above, wherein said agent $(M(OH)_3)$ or agent $(M(X)_3)$ are advantageously present in an amount at least 0.2% mole, with respect to the total moles of diol (AA), and optionally of the diol (A'A').

For the purpose of the present invention, the expression 'trihydroxy compound comprising three reactive hydroxy groups [agent $(M(OH)_3)$]' is intended to encompass not only trihydroxylated compounds but also hydroxylated compounds comprising more than three hydroxy group, but wherein only three of said hydroxy group are reactive.

For the purpose of the present invention, the expression 'trihalo compound comprising three reactive halo groups [agent $(M(X)_3)$]' is intended to encompass not only trihalogenated compounds but also halogenated compounds comprising more than three halo group, but wherein only three of said halo groups are reactive.

In a second embodiment of the present invention, the (t-PAES) polymeric material of the present invention can be manufactured by a process which comprises mixing:
i. from 0.1 to 15% wt. of at least one t-PAES (I-1) polymer having a number average molecular weight ($M_n$) below 18 000;
ii. from 30 to 99.9% wt. of at least one t-PAES (I-2) polymer having a number average molecular weight ($M_n$) above 25 000;
being understood that the % wt. is relative to the total weight of t-PAES (I-1) polymer and t-PAES (I-2) polymer.

The mixing of said t-PAES (I-1) and t-PAES (I-2) polymers can be carried out according to ordinary skills in the art such as notably by dry blending, solution mixing, melt mixing or a combination of dry blending and melt mixing.

For the purpose of the present invention, the t-PAES (I-1) and t-PAES (I-2) polymers are (t-PAES) polymers, that is to say that all features described here above for (t-PAES) polymers apply both but independently to t-PAES (I-1) and t-PAES (I-2) polymers but without the additional requirement of having a well-defined % fraction $M^{<5000}$.

As said, the t-PAES (I-1) polymer, as detailed above, has a number average molecular weight ($M_n$) below 18 000, preferably below 16 000 and more preferably below 14 000.

According to the present invention, the t-PAES (I-1) polymer has advantageously a number average molecular weight ($M_n$) of at least 1000; preferably of at least 2000, more preferably of at least 4000.

According to the present invention, the t-PAES (I-1) polymer has advantageously a number average molecular weight ($M_n$) in the range from 1000 to 18 000, preferably from 2000 to 16 000, more preferably from 4000 to 14 000.

Good results were obtained when the number average molecular weight ($M_n$) of the t-PAES (I-1) polymer of the invention was ranging from 4000 to 14 000.

As said, the t-PAES (I-2) polymer, as detailed above, has a number average molecular weight ($M_n$) above 25 000, preferably above 28 000 and more preferably above 30 000.

As such, there is no upper limit on the number average molecular weight ($M_n$) of the t-PAES (I-2) polymer of the present invention.

In one embodiment of the present invention, the t-PAES (I-2) polymer has advantageously a number average molecular weight ($M_n$) equal to or below 100 000, preferably equal to or below 75 000, preferably equal to or below 70 000, preferably equal to or below 65 000, preferably equal to or below 60 000, preferably equal to or below 55 000, preferably equal to or below 50000, preferably equal to or below 45 000.

The t-PAES (I-2) polymer has advantageously a polydispersity index (PDI) of less than 4.0, preferably of less than 3.8, more preferably of less than 3.5, most preferably of less than 3.02.

The t-PAES (I-2) polymer of the present invention has advantageously a PDI of more than 1.60, preferably more than 1.75, more preferably more than 2.00.

The t-PAES (I-1) polymer of the present invention generally has a PDI of less than 4.0, preferably of less than 3.8, more preferably of less than 3.5.

As such, there is no lower limit on the PDI of the t-PAES (I-1) polymer of the present invention.

In one embodiment of the present invention, the t-PAES (I-1) polymer has advantageously a PDI of more than 1.50, preferably more than 1.60.

According to the present invention, the t-PAES (I-1) polymer, as detailed above, and t-PAES (I-2) polymer, as detailed above, can be manufactured by the same process as discussed in detail above for the (t-PAES) polymer, except that it is not essential nor required that at least 1% mole of at least one agent (MOH), as defined above, with respect to the total moles of diol (AA), and optionally of the diol (A'A') is added at the start of the reaction in the monomer mixture and with the proviso that as to obtain the t-PAES (I-2) polymer, as detailed above, having a number average molecular weight ($M_n$) above 25 000, the overall amount of halo-groups and hydroxyl-groups of the monomers of the monomer mixture is substantially equimolecular, and the reaction is carried out at a total % monomer mixture concentration [total % monomers, herein after] of equal to or more than 22% and less than 50% with respect to the combined weight of monomer mixture and solvent mixture.

The preferred embodiments as detailed above for the total % monomers equally apply here.

It is also understood that the skilled in the art is controlling the number average molecular weight ($M_n$) of the t-PAES (I-1) polymer, as detailed above, by applying ordinary practice such as for example using an excess of one of the monomers, addition of catalysts, and the like.

The t-PAES (I-1) polymer can also be prepared as notably described in EP 0 383 600 A2.

In this second embodiment of the invention, the dihalo (BB) is preferably 4,4'-difluorodiphenyl sulfone (DFDPS) so as to obtain the t-PAES (I-2) polymer, as detailed above, having a number average molecular weight ($M_n$) above 25 000.

In this second embodiment of the invention, the dihalo (BB) is a 4,4'-difluorodiphenyl sulfone (DFDPS), a 4,4'-dichlorodiphenyl sulfone (DCDPS) and mixtures thereof so as to obtain the t-PAES (I-1) polymer, as detailed above, having a number average molecular weight ($M_n$) of below 18 000.

The molar ratio of 4,4'-difluorodiphenyl sulfone (DFDPS) to 4,4'-dichlorodiphenyl sulfone (DCDPS) in said mixture of (DFDPS) and (DCDPS) is advantageously comprised between 9:1 to 1:9, preferably said molar ratio is about 1:1, more preferably about 1:9.

The weight percent of the t-PAES (I-1) polymer, as detailed above, in the (t-PAES) polymeric material is generally of at least 0.5 wt. %, preferably of at least 0.7 wt. %, and more preferably of at least 0.9 wt. %, based on the total weight of the (t-PAES) polymeric material. It is further understood that the weight percent of the t-PAES (I-1) polymer in the (t-PAES) polymeric material will generally be of at most 12 wt. %, preferably of at most 10 wt. %, more preferably of at most 8 wt. %, based on the total weight of the (t-PAES) polymeric material.

Good results were obtained when the (t-PAES) polymeric material comprised the t-PAES (I-1) polymer in an amount of 0.5-12 wt. %, preferably of 0.7-10 wt. %, more preferably of 0.9-8 wt. %, based on the total weight of the (t-PAES) polymeric material.

The weight percent of the t-PAES (I-2) polymer in the (t-PAES) polymeric material is generally of at least 40 wt. %, generally of at least 50 wt. %, preferably of at least 60 wt. %, preferably of at least 70 wt. %, preferably of at least 80 wt. %, more preferably of at least 85 wt. %, most preferably of at least 90 wt. %, based on the total weight of the (t-PAES) polymeric material. It is further understood that the weight percent of the t-PAES (I-2) polymer in the (t-PAES) polymeric material will generally be of at most 99.5 wt. %, preferably of at most 99.1 wt. %, based on the total weight of the (t-PAES) polymeric material.

Good results were obtained when the (t-PAES) polymeric material comprised the t-PAES (I-2) polymer in an amount of 90-99.5 wt. % based on the total weight of the (t-PAES) polymeric material.

Excellent results were obtained when the (t-PAES) polymeric material consists of the t-PAES (I-2) polymer, as detailed above and the t-PAES (I-1) polymer, as detailed above.

The weight of the t-PAES (I-2) polymer, based on the total weight of the t-PAES (I-2) polymer and the t-PAES (I-1) polymer, is advantageously equal to or above 85%, preferably equal to or above 90%. On the other hand, the weight of the t-PAES (I-2) polymer, based on the total weight of the t-PAES (I-2) polymer and the t-PAES (I-1) polymer, is advantageously below 99.5%, preferably below 99.1%.

Another aspect of the present invention concerns the process for manufacturing (t-PAES) polymeric material as described above.

The (t-PAES) polymeric material of the present invention, can notably be used in HP/HT applications.

As per the processing, (t-PAES) polymeric material of the present invention, can be advantageously processed for yielding articles by melt processing (including injection moulding, extrusion moulding, compression moulding), but also by other processing procedures such as notably spray coating, powder coating selective sintering, fused deposition modelling and the like.

It is another object of the present invention to provide a shaped article comprising the (t-PAES) polymeric material of the present invention.

The total weight of (t-PAES) polymeric material, based on the total weight of the article, is advantageously above 50%, preferably above 80%; more preferably above 90%; more preferably above 95% and more preferably above 99%. If desired, the article may consist of (t-PAES) polymeric material.

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

Raw Materials 1,1':4',1''-terphenyl-4,4''-diol commercially available from Yonghi Chemicals, China, further purified by washing with ethanol/water (90/10) at reflux. The purity of the resulting material was shown to be higher than 94.0% area as measured by Gas Chromatography. Said 1,1':4',1''-terphenyl-4,4''-diol is including the impurities phenylphenol and biphenylphenol, depending on the efficiency of the purification of the 1,1':4',1''-terphenyl-4,4''-diol. The monomer is typically prepared by palladium-catalyzed coupling of 1,4-dibromobenzene and 4-bromomagnesiumanisole (Grignard reagent of 4-bromoanisole), as described in Salunke et al, J. Polym. Sci., Part A: Polymer Chem., 2002, V 40, P 55-69.

4,4'-difluorodiphenylsulfone commercially available from Aldrich (99% grade, 99.32% measured) or from Marshallton (99.92% pure by GC).

4,4'-dichlorodiphenylsulfone commercially available from SOLVAY SPECIALTY POLYMERS USA, LLC (99.8% pure by GC).

Diphenyl sulfone (polymer grade) commercially available from Proviron (99.8% pure).

Potassium carbonate with a $d_{90}$<45 μm commercially available from Armand products.

Potassium fluoride was procured from Aldrich (99.99+%, anhydrous)

Copper(I) oxide was procured from Aldrich (99.99+%, anhydrous)

Lithium chloride (99+%, ACS grade) commercially available from Acros.

General Procedure for the Preparation of a t-PAES Polymer

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 89.25 g of diphenyl sulfone, 28.853 g of a specific type of 1,1':4',1''- terphenyl-4,4"-diol (the corresponding specifications are indicated in the Table 2, below and 27.968 g of 4,4'-difluorodiphenylsulfone (corresponding to a total % monomers of 38.9% and molar ratio dihalo (BB)/diol of 1.000). The flask content was evacuated under vacuum and then filled with high purity nitrogen (containing less than 10 ppm $O_2$). The reaction mixture was then placed under a constant nitrogen purge (60 mL/min). The reaction mixture was heated slowly to 220° C. At 220° C., 15.354 g of $K_2CO_3$ were added via a powder dispenser to the reaction mixture over 20 minutes. At the end of the addition, the reaction mixture was heated to 320° C. at 1° C./minute. After 6 minutes at 320° C., 1.119 g of 4,4'-difluorodiphenylsulfone were added to the reaction mixture while keeping a nitrogen purge on the reactor. After 2 minutes, 4.663 g of lithium chloride were added to the reaction mixture. 2 minutes later, another 0.280 g of 4,4'-difluorodiphenylsulfone were added to the reactor and the reaction mixture was kept at temperature for 5 minutes. The reactor content was then poured from the reactor into a stainless steel pan and cooled. The solid was broken up and ground in an attrition mill through a 2 mm screen. Diphenyl sulfone and salts were extracted from the mixture with acetone then water at pH between 12 and 11 then with acetone. The powder was then washed with 1200 mL water containing 2 g of sodium dihydrogen phosphate and 2 g of sodium monohydrogenphosphate. The powder was dried at 120° C. under vacuum for 12 hours yielding 33 g of a light brown powder. The molecular weights of the final t-PAES polymers were measured by GPC, as detailed below and are reported in Table 2. The experimental data are summarized in Table 2.

Comparative Examples 1-4 and Examples 5 and 6

All these examples were prepared according to the general procedure using the different grades of 1,1':4',1"-terphenyl-4,4"-diol (as indicated in Table 2) and different reaction times (as indicated in Table 2). The molecular weights of the final t-PAES polymers were measured by GPC, as detailed below and are reported in Table 2. All experimental data are summarized in Table 2. Example 6 also corresponds to a t-PAES (I-2) polymer.

Preparation of a t-PAES (I-1) Polymer

Example 7

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 89.25 g of diphenyl sulfone, 28.853 g of a specific type of 1,1':4',1"-terphenyl-4,4"-diol (details are indicated in Table 2), 2.797 g of 4,4'-difluorodiphenylsulfone, 28.430 g of 4,4'-dichlorodiphenylsulfone and 0.157 g of copper (I) oxide. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 220° C. At 220° C., 15.354 g of $K_2CO_3$ were added via a powder dispenser to the reaction mixture over 20 minutes. At the end of the addition, the reaction mixture was heated to 320° C. at 1° C./minute. After 2 hours at 320° C., 1.579 g of 4,4'-dichlorodiphenylsulfone were added to the reaction mixture while keeping a nitrogen purge on the reactor. After 5 minutes, 2.332 g of lithium chloride were added to the reaction mixture. 10 minutes later, another 0.632 g of 4,4'-dichlorodiphenylsulfone were added to the reactor and the reaction mixture was kept at temperature for 15 minutes. The reactor content was then poured from the reactor into a stainless steel pan and cooled. The solid was broken up and ground in an attrition mill through a 2 mm screen. Diphenyl sulfone and salts were extracted from the mixture with acetone then water at pH between 12 and 11 then with acetone. The powder was then washed with 1200 mL water containing 2 g of sodium dihydrogen phosphate and 2 g of sodium monohydrogenphosphate. The powder was dried at 120° C. under vacuum for 12 hours yielding 43.26 g of a light brown powder. The molecular weight of the final t-PAES (I-1) polymer was measured by GPC, as detailed below and are reported in Table 2. The experimental data are summarized in Table 2. The sample could not be molded as the resulting plaque was too brittle.

Preparation of Another t-PAES (I-1) Polymer

Example 8

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 89.25 g of diphenyl sulfone, 28.853 g of a specific type of 1,1':4',1"-terphenyl-4,4"-diol (details are indicated in Table 2) 1,1':4',1"-terphenyl-4,4"-diol, 2.797 g of 4,4'-difluorodiphenylsulfone, 28.430 g of 4,4'-dichlorodiphenylsulfone and 0.320 g of potassium fluoride. The flask content was evacuated under vacuum and then filled with high purity nitrogen (containing less than 10 ppm $O_2$). The reaction mixture was then placed under a constant nitrogen purge (60 mL/min). The reaction mixture was heated slowly to 220° C. At 220° C., 15.354 g of $K_2CO_3$ were added via a powder dispenser to the reaction mixture over 20 minutes. At the end of the addition, the reaction mixture was heated to 320° C. at 1° C./minute. After 2 hours at 320° C., 1.579 g of 4,4'-dichlorodiphenylsulfone were added to the reaction mixture while keeping a nitrogen purge on the reactor. After 5 minutes, 2.332 g of lithium chloride were added to the reaction mixture. 10 minutes later, another 0.632 g of 4,4'-dichlorodiphenylsulfone were added to the reactor and the reaction mixture was kept at temperature for 15 minutes. The reactor content was then poured from the reactor into a SS pan and cooled. The solid was broken up and ground in an attrition mill through a 2 mm screen. Diphenyl sulfone and salts were extracted from the mixture with acetone then water at pH between 12 and 11 then with acetone. The powder was then washed with 1200 mL water containing 2 g of sodium dihydrogen phosphate and 2 g of sodium monohydrogenphosphate. The powder was dried at 120° C. under vacuum for 12 hours yielding 39.26 g of a light brown powder. The molecular weight of the final t-PAES (I-1) polymer was measured by GPC, as detailed below and are reported in Table 2. The experimental data are summarized in Table 2. The sample could not be molded as the resulting plaque was too brittle.

General Procedure for the Preparation of a t-PAES Polymeric Material by Mixing a t-PAES (I-1) Polymer and a t-PAES (I-2) Polymer Examples 9-14

The powder obtained as described in Example 6 was mixed with various amounts of powders obtained in Example 7 and Example 8, respectively. The different amounts are summarized in Table 2. The powders (all with average particle size below 400 μm) were tumbled. The molecular weights of the final t-PAES polymeric materials were measured by GPC, as detailed below and are reported in Table 2. The experimental data are summarized in Table 2. The following characterizations carried out on the materials of the Examples are indicated hereinafter:

Determination of 4,4'-Difluorodiphenylsulfone Purity by Gas Chromatography

GC analysis was performed on an HP5890 series 11 gas chromatograph using a Restek RTx-5MS, 15 m×0.25 mm id×0.25 um film thickness column. The following GC conditions were used:
Helium flow rate: 1 mL/minute,
Injector temperature: 290° C.
FID temperature: 300° C.
Oven Temperature Program: 60° C., hold 1 minute, 20° C./minute to 325° C., hold
15 minutes
Total run time: 30 minutes
Injection volume: 1 μL
Split 15:1
The sample was prepared by dissolving 0.2 g of DPS in 5 mL of acetone. The purity concentration was quoted as area %, calculated from GC FID peak areas.

Determination of 1,1':4',1''-Terphenyl-4,4''-Diol Purity by Gas Chromatography

GC analysis was performed on an HP5890 series 11 gas chromatograph using a Restek RTx-5MS, 15 m×0.25 mm id×0.25 um film thickness column. The following GC conditions were used:
Helium flow rate: 1 mL/minute,
Injector temperature: 300° C.
FID temperature: 320° C.
Oven Temperature Program: 150° C., hold 1 minute, 30° C./minute to 325° C., hold 25 minutes
Total run time: 32 minutes
Injection volume: 1 μL
Split 15:1
The sample was prepared by dissolving 0.2 g of 1,1':4', 1''-terphenyl-4,4''-diol in 2.5 mL of N,N-dimethylformamide. The purity concentrations were quoted as area %, calculated from GC FID peak areas. Retention times are:
phenylphenol: 6.87 minutes
biphenylphenol: 8.91 minutes
1,1':4',1''-terphenyl-4,4''-diol: 10.65 minutes Molecular Weight Measurements by a GPC Method GPC Condition Pump: 515 HPLC pump manufactured by Waters
Detector: UV 1050 series manufactured by HP
Software: Empower Pro manufactured by Waters
Injector: Waters 717 Plus Auto sampler
Flow rate: 0.5 ml/min
UV detection: 270 nm
Column temperature: 40° C.
Column: 2×PL Gel mixed D, 5 micron, 300 mm×7.5 mm 5 micron manufactured by Agilent
Injection: 20μ liter
Runtime: 60 minutes Eluent: N-Methyl-2-pyrrolidone (Sigma-Aldrich, Chromasolv Plus for HPLC>99%) with 0.1 mol Lithium bromide (Fisher make). Mobile phase should be stored under nitrogen or inert environment Calibration standard: Polystyrene standards part number PL2010-0300 manufactured by Agilent was used for calibration. Each vial contains a mixture of four narrow polydispersity polystyrene standards (a total 11 standard, 371100, 238700, 91800, 46500, 24600, 10110, 4910, 2590, 1570, 780 used to establish calibration curve).

Concentration of standard: 1 milliliter of mobile phase added in to each vial before GPC injection for calibration.

The resulting calibration standards were passed through to GPC column according to the GPC conditions mentioned above.

Calibration Curve: 1) Type: Relative, Narrow Standard Calibration 2) Fit: $3^{rd}$ order regression.

Integration and calculation: Empower Pro GPC software manufactured by Waters used to acquire data, calibration and molecular weight calculation. Peak integration start and end points are manually determined from significant difference on global baseline.

In general, ° A fraction $M^{<x}$ is calculated by software as the percent area of the distribution with molecular weights less than molecular weight associated with the molecular weight marker (x). Slice data also can be used to get % fraction $M^{<x}$. The slice table displays information about each slice in the molecular weight distribution.

Sample Preparation:

25 mg of the (t-PAES) polymer was dissolved in 10 ml of 4-chlorophenol upon heating at 170 to 200° C. A small amount (0.2 to 0.4 ml) of said solution obtained was diluted with 4 ml of N-Methyl-2-pyrrolidone. The resulting solution was passed through to GPC column according to the GPC conditions mentioned above.

Physical Property Measurements

DSC measurements were done according to ASTM D3418-03, E1356-03, E793-06, E794-06 on TA Instruments Q20 with nitrogen as carrier gas (99.998% purity, 50 mL/min). Temperature and heat flow calibrations were done using indium. Sample size was 5 to 7 mg. The weight was recorded ±0.01 mg.

The heat cycles were:

$1^{st}$ heat cycle: 50.00° C. to 450.00° C. at 20.00° C./min, isothermal at 450.00° C. for 1 min.

$1^{st}$ cool cycle: 450.00° C. to 50.00° C. at 20.00° C./min, isothermal for 1 min.

$2^{nd}$ heat cycle: 50.00° C. to 450.00° C. at 20.00° C./min, isothermal at 380.00° C. for 1 min.

The glass transition temperature was measured on the polymeric material powder from the $2^{nd}$ heat thermogram according to the ASTM D3418, by drawing a baseline before the transition and a baseline after the transition: the Tg is the temperature at half height between these two lines.

Melting Temperature Measurements:

A circular plaque 51 mm (diameter)×3.2 mm (thickness) plaque was prepared from the corresponding polymeric materials, e.g. t-PAES polymers (comparative examples 1-4, examples 5 and 6); t-PAES (I-1) polymer (examples 7 and 8) or from the t-PAES polymeric materials (e.g. examples 9-14) by compression molding under the following conditions as shown in Table 1 below:

TABLE 1

| Step # | |
|---|---|
| 1 | preheat at 370° C., |
| 2 | 400° C./15 minutes, 2000 kg-f |
| 3 | 400° C./2 minutes, 2700 kg-f |
| 4 | cool down to 30° C. over 45 minutes, 2000 kg-f |

The plaque was then annealed at 320° C. for 3 hours under air.

The first and second melting temperatures ($T_{mI}$ and $T_{mII}$) were measured on the molded plaques according to the ASTM D3418: the peak temperature at which the first and the second melting endotherms are observed in the 1$^{st}$ heat cycle (20° C./min up to 450° C.) are the first ($T_{mI}$) and the second ($T_{mII}$) melting temperature.

All results are summarized in Table 2.

TABLE 2

| | t-PAES polymer | | | | | | t-PAES (I-1) polymer | |
|---|---|---|---|---|---|---|---|---|
| Examples (Ex.) | C1 | C2 | C3 | C4 | 5 | 6 | 7 | 8 |
| Weight of t-PAES (I-1) polymer (g) + Weight of t-PAES (I-2) polymer (g) | | | | | | | | |
| Reaction time at 320° C. (min) | 6 | 19 | 13 | 32 | 27 | 66 | 120 | 120 |
| Monomer purity data | | | | | | | | |
| GC purity terphenyldiol (area %) | 99.1 | 99.1 | 99.1 | 99.1 | 98.8 | 96.5 | 99.1 | 99.1 |
| Phenylphenol (area %) | 0.23 | 0.23 | 0.23 | 0.23 | 0.31 | 1.01 | 0.23 | 0.23 |
| Biphenylphenol (area %) | 0.67 | 0.67 | 0.67 | 0.67 | 0.89 | 2.49 | 0.67 | 0.67 |
| Phenylphenol + Biphenylphenol (mole %) | 0.78 | 0.78 | 0.78 | 0.78 | 1.03 | 2.98 | 0.78 | 0.78 |
| Molecular weight data | | | | | | | | |
| Mn | 37281 | 41867 | 43711 | 47925 | 48605 | 39304 | 13245 | 9410 |
| Mw | 73988 | 82930 | 88130 | 97036 | 100243 | 101805 | 25306 | 14871 |
| Mz | 114165 | 119648 | 123923 | 129678 | 129598 | 213088 | 45916 | 22773 |
| Mw/Mn (PDI) | 1.98 | 1.98 | 2.02 | 2.02 | 2.06 | 2.59 | 1.91 | 1.58 |
| Mz/Mw | 1.54 | 1.44 | 1.41 | 1.34 | 1.29 | 2.09 | 1.81 | 1.53 |
| % fraction M$^{<5000}$ ($^a$) | 1.03 | 0.86 | 0.82 | 0.74 | 0.98 | 0.70 | 10.62 | 11.58 |
| 3.02-PDI (%) | 1.04 | 1.04 | 1.00 | 1.00 | 0.96 | 0.43 | 1.11 | 1.44 |
| Physical properties | | | | | | | | |
| Tg (° C.) | 251 | 254 | 251 | 255 | 255 | 248 | 218 | 198 |
| First melting ($T_{mI}$) (° C.) | 328 | 320 | 312 | 316 | 333 | 335 | N/A | N/A |
| Second melting (TmII) (° C.) | 378 | 373 | 370 | 367 | 371 | 375 | N/A | N/A |
| Δ ($T_{mI}$) − Tg (° C.) | 77 | 66 | 61 | 61 | 78 | 87 | | |

| | t-PAES polymeric material | | | | | |
|---|---|---|---|---|---|---|
| Examples (Ex.) | 9 | 10 | 11 | 12 | 13 | 14 |
| Weight of t-PAES (I-1) polymer (g) + Weight of t-PAES (I-2) polymer (g) | 0.07 g Ex. 7 + 7.00 g Ex. 5 | 0.35 g Ex. 7 + 6.65 g Ex. 5 | 0.70 g Ex. 7 + 6.30 g Ex. 5 | 0.07 g Ex. 8 + 7.00 g Ex. 5 | 0.35 g Ex. 8 + 6.65 g Ex. 5 | 0.07 g Ex. 8 + 6.30 g Ex. 5 |
| Reaction time at 320° C. (min) | | | | | | |
| Monomer purity data | | | | | | |
| GC purity terphenyldiol (area %) | | | | | | |
| Phenylphenol (area %) | | | | | | |
| Biphenylphenol (area %) | | | | | | |
| Phenylphenol + Biphenylphenol (mole %) | | | | | | |
| Molecular weight data | | | | | | |
| Mn | 47342 | 42881 | 38363 | 46662 | 40227 | 34313 |
| Mw | 99493 | 96496 | 92749 | 99389 | 95974 | 92749 |
| Mz | 129300 | 128066 | 126429 | 129409 | 128619 | 127552 |
| Mw/Mn (PDI) | 2.10 | 2.25 | 2.42 | 2.13 | 2.39 | 2.70 |
| Mz/Mw | 1.30 | 1.33 | 1.36 | 1.30 | 1.34 | 1.38 |
| % fraction M$^{<5000}$ ($^a$) | 1.08 | 1.46 | 1.94 | 1.09 | 1.51 | 2.04 |
| 3.02-PDI (%) | 0.92 | 0.77 | 0.60 | 0.89 | 0.63 | 0.32 |
| Physical properties | | | | | | |
| Tg (° C.) | 255 | 251 | 250 | 255 | 250 | 248 |
| First melting ($T_{mI}$) (° C.) | 337 | 342 | 342 | 344 | 338 | 336 |

| Second melting (TmII) (° C.) | 371 | 372 | 371 | 371 | 371 | 371 |
| Δ (T$_{mI}$) − Tg (° C.) | 82 | 92 | 92 | 89 | 88 | 88 |

($^a$)Experimentally measured by the GPC method, detailed above

The invention claimed is:

1. A poly(arylether sulfone) polymeric material, (t-PAES) polymeric material, comprising polymer molecules wherein more than 50% moles of the recurring units of said polymer molecules are recurring units (R$_t$), equal to or different from each other, complying with formula (S$_t$):

-E-Ar$^1$—SO$_2$—[Ar$^2$-(T-Ar$^3$)$_n$—SO$_2$]$_m$—Ar$^4$—   (formula S$_t$)

wherein:
n and m, equal to or different from each other, are independently zero or an integer of 1 to 5;
each of Ar$^1$, Ar$^2$, Ar$^3$ and Ar$^4$ equal to or different from each other and at each occurrence, is an aromatic moiety;
T is a bond or a divalent group optionally comprising one or more than one heteroatom;
E is of formula (E$_t$):

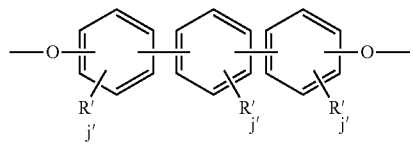

wherein
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 1 to 4; and
wherein the fraction of polymer molecules having a molecular weight of below 5,000, % fraction M$^{<5000}$, with respect to all the polymer molecules in said polymeric material is of at most 10% weight, and wherein said % fraction M$^{<5000}$ is of at least [3.02-PDI] % when the polymeric material possesses a polydispersity index (PDI) of below 3.02.

2. The (t-PAES) polymeric material according to claim 1, wherein said recurring units (R$_t$) are selected from the group consisting of those of formula (S$_t$-1) to (S$_t$-4) herein below:

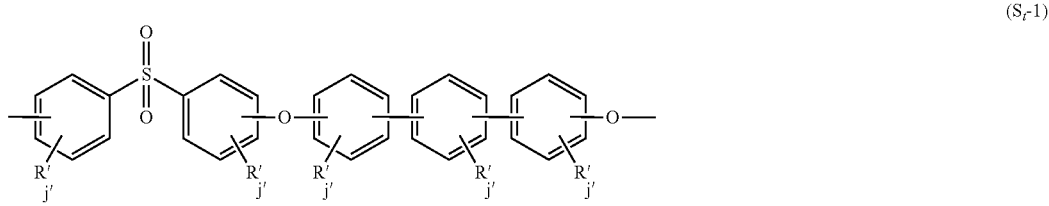

(S$_t$-1)

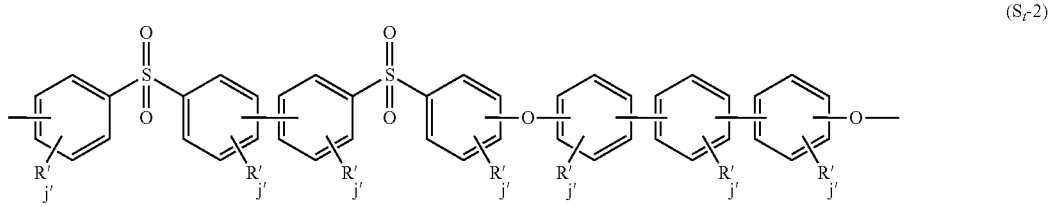

(S$_t$-2)

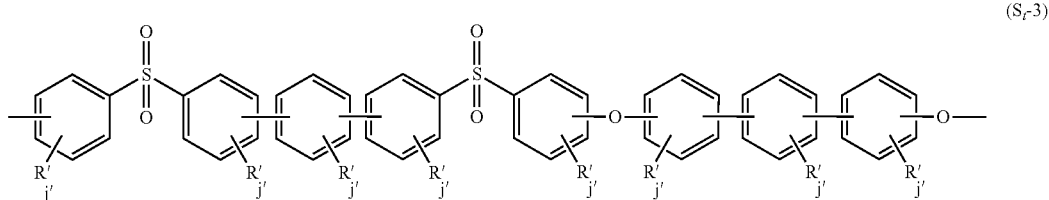

(S$_t$-3)

-continued

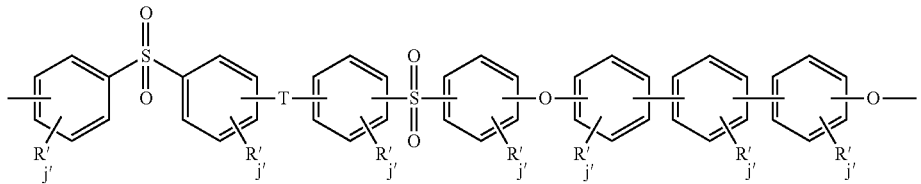
(S$_f$-4)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 1 to 4; and
T is a bond or a divalent group optionally comprising one or more than one heteroatom.

3. The (t-PAES) polymeric material according to claim 1, wherein said polymer molecules additionally comprise recurring units ($R_a$) of formula ($K_a$):

(formula $K_a$)

wherein:
n and m, equal to or different from each other, are independently zero or an integer of 1 to 5;
each of $Ar^5$, $Ar^6$, $Ar^7$ and $Ar^8$ equal to or different from each other and at each occurrence, is an aromatic moiety;
T is a bond or a divalent group optionally comprising one or more than one heteroatom;
E is of formula ($E_t$):

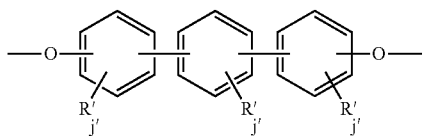

wherein
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium.

4. The (t-PAES) polymeric material according to claim 1, wherein said polymer molecules additionally comprise recurring units ($R_b$) comprising a Ar—SO$_2$—Ar group, with Ar and Ar', equal to or different from each other, are aromatic groups, said recurring units ($R_b$) complying with formula (S1):

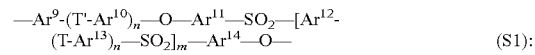
(S1):

wherein:
$Ar^9$, $Ar^{10}$, $Ar^{11}$, $Ar^{12}$, $Ar^{13}$ and $Ar^{14}$, equal to or different from each other and at each occurrence, are independently an aromatic mono- or polynuclear group;
T and T', equal to or different from each other and at each occurrence, is independently a bond or a divalent group optionally comprising one or more than one heteroatom; and
n and m, equal to or different from each other, are independently zero or an integer of 1 to 5.

5. The (t-PAES) polymeric material according to claim 1, wherein said polymer molecules additionally comprise recurring units ($R_c$) comprising a Ar—C(O)—Ar' group, with Ar and Ar', equal to or different from each other, are aromatic groups, said recurring units ($R_c$) being selected from the group consisting of formulae (J-A) to (J-L):

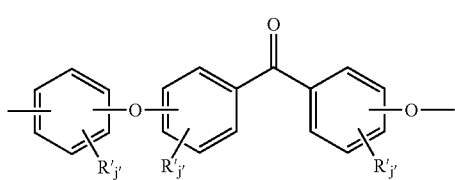
(J-A)

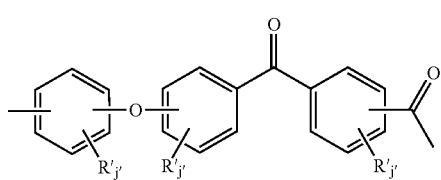
(J-B)

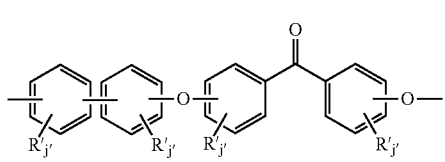
(J-C)

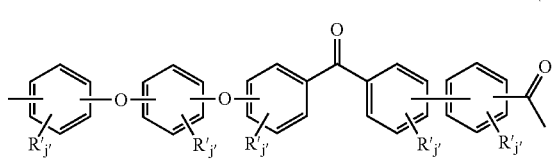
(J-D)

-continued

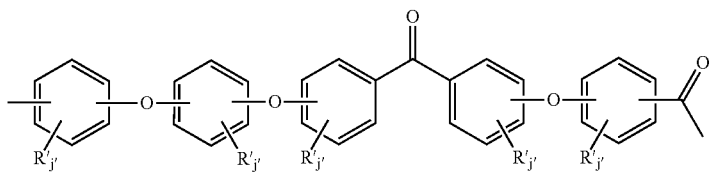
(J-E)

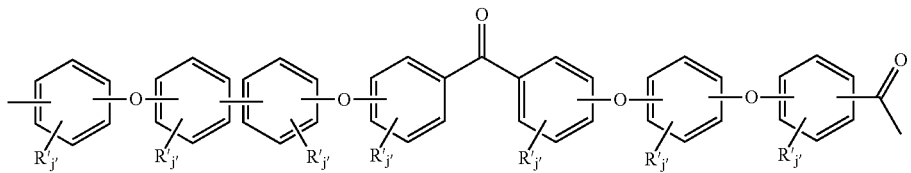
(J-F)

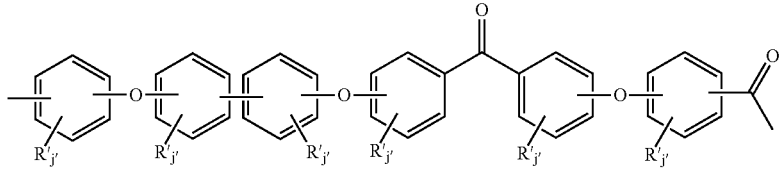
(J-G)

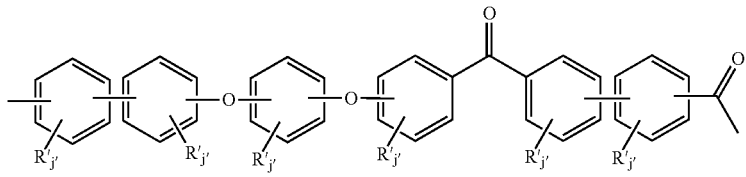
(J-H)

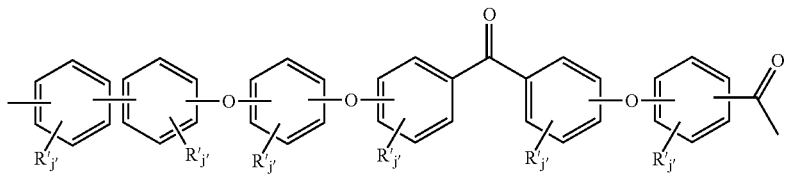
(J-I)

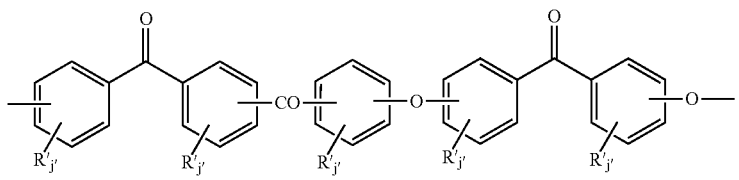
(J-J)

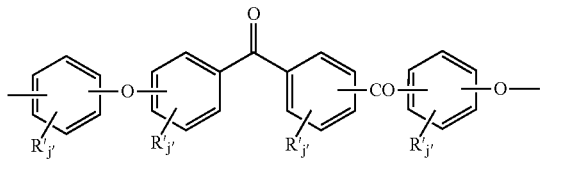
(J-K)

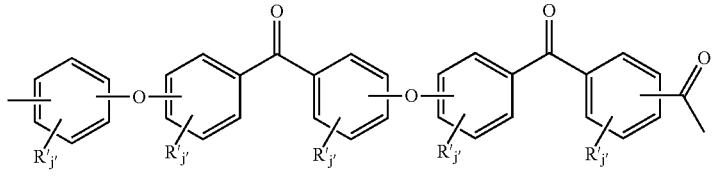
(J-L)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or is an integer from 0 to 4.

6. The (t-PAES) polymeric material according to claim 1, wherein said (t-PAES) polymeric material has a polydispersity index (PDI) of more than 2.02.

7. A process for manufacturing the (t-PAES) polymeric material according to claim 1, wherein the (t-PAES) polymeric material is a (t-PAES) polymer, comprising reacting in a solvent mixture comprising a polar aprotic solvent and in the presence of an alkali metal carbonate, a monomer mixture which comprises:

at least one dihydroxyaryl compound, diol (AA), of formula (T):

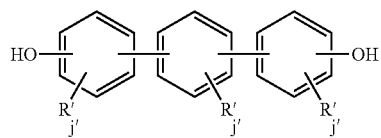

formula (T)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 1 to 4;

at least one dihaloaryl compound, dihalo(BB), of formula (S):

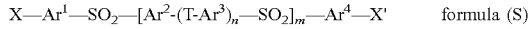

X—Ar$^1$—SO$_2$—[Ar$^2$-(T-Ar$^3$)$_n$—SO$_2$]$_m$—Ar$^4$—X'    formula (S)

wherein n and m, equal to or different from each other, are independently zero or an integer of 1 to 5; X and X', equal to or different from each other, are halogens selected from F, Cl, Br, I;

each of Ar$^1$, Ar$^2$, Ar$^3$ and Ar$^4$ equal to or different from each other and at each occurrence, is an aromatic moiety;

T is a bond or a divalent group optionally comprising one or more than one heteroatom;

optionally, at least one dihydroxyaryl compound, diol (A'A'), different from diol (AA);

optionally, at least one dihaloaryl compound, dihalo (B'B'), different from dihalo (BB);

and at least 1% mole of at least one hydroxyl compound comprising only one reactive hydroxy group, agent (MOH), with respect to the total moles of diol (AA), and optionally of the diol (A'A').

8. A process for manufacturing the (t-PAES) polymeric material according to claim 1, comprising mixing:
i. from 0.1 to 15% wt. of at least one t-PAES (I-1) polymer having a number average molecular weight (M$_n$) below 18,000; and
ii. from 30 to 99.9% wt. of at least one t-PAES (I-2) polymer having a number average molecular weight (M$_n$) above 25,000;
wherein the % wt. is based on the total weight of t-PAES (I-1) polymer and t-PAES (I-2) polymer.

9. The process according to claim 8, wherein the process comprises admixing the t-PAES (I-1) polymer and t-PAES (I-2) polymer by dry blending, solution mixing, melt mixing, or a combination of dry blending and melt mixing.

10. The process according to claim 8, wherein the t-PAES (I-1) polymer and t-PAES (I-2) polymer are manufactured by a process comprising reacting in a solvent mixture comprising a polar aprotic solvent and in the presence of an alkali metal carbonate, a monomer mixture comprising:

at least one dihydroxyaryl compound, diol (AA), of formula (T):

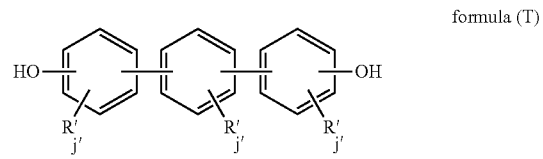

formula (T)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 1 to 4;

at least one dihaloaryl compound, dihalo(BB), of formula (S):

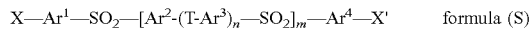

X—Ar$^1$—SO$_2$—[Ar$^2$-(T-Ar$^3$)$_n$—SO$_2$]$_m$—Ar$^4$—X'    formula (S)

wherein:
n and m, equal to or different from each other, are independently zero or an integer of 1 to 5; X and X', equal to or different from each other, are halogens selected from F, Cl, Br, I;

each of Ar$^1$, Ar$^2$, Ar$^3$ and Ar$^4$ equal to or different from each other and at each occurrence, is an aromatic moiety;

T is a bond or a divalent group optionally comprising one or more than one heteroatom;

optionally, at least one dihydroxyaryl compound, diol (A'A'), different from diol (AA);

optionally, at least one dihaloaryl compound, dihalo (B'B'), different from dihalo (BB);

with the proviso that as to obtain the t-PAES (I-2) polymer, having a number average molecular weight (M$_n$) above 25,000, the overall amount of halo-groups and hydroxyl-groups of the monomers of the monomer mixture is substantially equimolecular, and the reaction is carried out at a total % monomer mixture concentration, total % monomers, of equal to or more than 22% and less than 50% with respect to the combined weight of monomer mixture and solvent mixture.

11. The process according to claim 7, wherein the monomer mixture comprises at least one dihaloaryl compound, dihalo (B'B'), different from dihalo (BB) of formula (K):

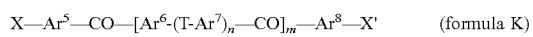

X—Ar$^5$—CO—[Ar$^6$-(T-Ar$^7$)$_n$—CO]$_m$—Ar$^8$—X'    (formula K)

wherein:
n and m, equal to or different from each other, are independently zero or an integer of 1 to 5;

each of Ar$^5$, Ar$^6$, Ar$^7$ and Ar$^8$ equal to or different from each other and at each occurrence, is an aromatic moiety;

T is a bond or a divalent group optionally comprising one or more than one heteroatom; and X and X', equal to or different from each other, are independently a halogen atom.

12. The process according to claim 7, wherein the monomer mixture comprises at least one dihydroxyl compounds diol (A'A') different from diol (AA), selected from the group consisting of compounds of formula (D):

HO—Ar$^9$-(T'-Ar$^{10}$)$_n$—O—H    formula (D)

wherein:
n is zero or an integer of 1 to 5;
each of Ar$^9$ and Ar$^{10}$, equal to or different from each other and at each occurrence, is an aromatic moiety of the formula:

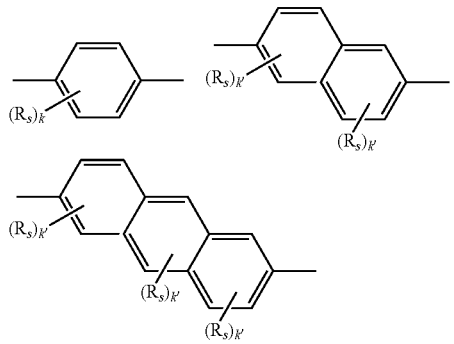

wherein:
each R$_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
k is zero or an integer of 1 to 4; k' is zero or an integer of 1 to 3; and
T' is a bond or a divalent group optionally comprising one or more than one heteroatom.

13. An article comprising the (t-PAES) polymeric material according to claim 1.

14. A process for manufacturing the article according to claim 13 comprising at least one step of injection moulding, extrusion moulding, blow moulding, foam processing, compression molding, casting and coating, or combinations thereof.

15. The (t-PAES) polymeric material according to claim 1, wherein T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

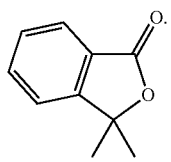

16. The (t-PAES) polymeric material according to claim 4, wherein T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

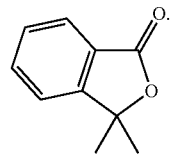

17. The process according to claim 10, wherein the monomer mixture comprises at least one dihaloaryl compound, dihalo (B'B'), different from dihalo (BB) of formula (K):

X—Ar$^5$—CO—[Ar$^6$-(T-Ar$^7$)$_n$—CO]$_m$—Ar$^8$—X'    (formula K)

wherein:
n and m, equal to or different from each other, are independently zero or an integer of 1 to 5;
each of Ar$^5$, Ar$^6$, Ar$^7$ and Ar$^8$ equal to or different from each other and at each occurrence, is an aromatic moiety;
T is a bond or a divalent group optionally comprising one or more than one heteroatom; and
X and X', equal to or different from each other, are independently a halogen atom.

18. The process according to claim 17, wherein X and X', equal to or different from each other, are independently Cl or F.

19. The process according to claim 10, wherein the monomer mixture comprises at least one dihydroxyl compounds diol (A'A') different from diol (AA), selected from the group consisting of compounds of formula (D):

HO—Ar$^9$-(T'-Ar$^{10}$)$_n$—O—H    formula (D)

wherein:
n is zero or an integer of 1 to 5;
each of Ar$^9$ and Ar$^{10}$, equal to or different from each other and at each occurrence, is an aromatic moiety of the formula:

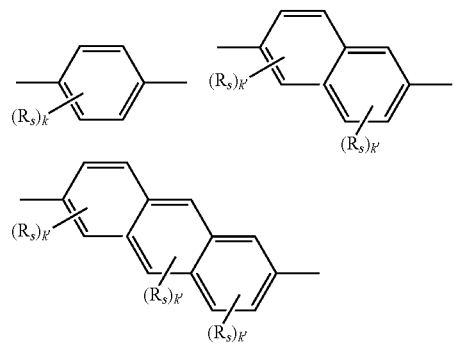

wherein:
each R$_s$ is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
k is zero or an integer of 1 to 4; k' is zero or an integer of 1 to 3; and
T' is a bond or a divalent group optionally comprising one or more than one heteroatom.

* * * * *